United States Patent
Mahaffey

(10) Patent No.: US 11,199,215 B2
(45) Date of Patent: Dec. 14, 2021

(54) NUT CLIP

(71) Applicant: Novaria Holdings, LLC, North Richland Hills, TX (US)

(72) Inventor: Jimmy Wayne Mahaffey, Ravenden, AR (US)

(73) Assignee: Novaria Holdings, LLC, North Richland Hills, TX (US)

(*) Notice: Subject to any disclaimer, the term of this patent is extended or adjusted under 35 U.S.C. 154(b) by 251 days.

(21) Appl. No.: 16/374,353

(22) Filed: Apr. 3, 2019

(65) Prior Publication Data
US 2019/0309789 A1 Oct. 10, 2019

Related U.S. Application Data

(60) Provisional application No. 62/654,205, filed on Apr. 6, 2018.

(51) Int. Cl.
*F16B 37/04* (2006.01)
*F16B 5/06* (2006.01)

(52) U.S. Cl.
CPC .......... *F16B 37/043* (2013.01); *F16B 37/044* (2013.01); *F16B 5/0635* (2013.01)

(58) Field of Classification Search
CPC ...... F16B 37/02; F16B 37/044; F16B 37/043; F16B 37/041; F16B 37/045; F16B 5/0635; F16B 5/045
See application file for complete search history.

(56) References Cited

U.S. PATENT DOCUMENTS

| | | | |
|---|---|---|---|
| 1,403,744 A | 1/1922 | Dodds | |
| 2,815,789 A * | 12/1957 | Hutson | F16B 37/044 411/111 |
| 5,181,817 A | 1/1993 | Anderson | |
| 5,350,266 A | 9/1994 | Espey et al. | |
| 6,053,680 A * | 4/2000 | Menke | F16B 37/041 411/112 |
| 6,053,683 A | 4/2000 | Cabiran | |
| 6,125,479 A | 10/2000 | Fraleigh | |
| 6,435,791 B1 | 8/2002 | Bydalek | |
| 7,648,319 B1 * | 1/2010 | Ochoa | F16B 37/044 411/174 |
| 7,658,580 B1 | 2/2010 | Conway et al. | |
| 7,823,262 B2 * | 11/2010 | Toosky | F16B 37/062 29/402.03 |
| 9,133,874 B2 | 9/2015 | Hill | |
| D788,574 S | 6/2017 | Baiz et al. | |
| 10,473,139 B2 * | 11/2019 | Costabel | F16B 37/044 |

(Continued)

FOREIGN PATENT DOCUMENTS

JP 2017-203475 11/2017

OTHER PUBLICATIONS

International Search Report and Written Opinion of PCT/US2019/040638 dated Sep. 30, 2019, 10 pages.

(Continued)

*Primary Examiner* — Victor D Batson
*Assistant Examiner* — Amit Singh Dhillon
(74) *Attorney, Agent, or Firm* — Foley & Lardner LLP

(57) ABSTRACT

A nut clip is disclosed. The nut clip may have a nut and a clip. The clip may have a forward reaction wall and an aft reaction wall structured to react tightening and loosening forces associated with the nut and to facilitate caging of the nut.

14 Claims, 21 Drawing Sheets

(56) References Cited

U.S. PATENT DOCUMENTS

| | | | |
|---|---|---|---|
| 10,823,217 B2* | 11/2020 | Costabel | F16B 5/0635 |
| 2002/0119026 A1* | 8/2002 | Gauron | F16B 37/043 |
| | | | 411/112 |
| 2004/0202523 A1* | 10/2004 | Csik | F16B 37/043 |
| | | | 411/112 |
| 2005/0100425 A1 | 5/2005 | Wu | |
| 2008/0310931 A1* | 12/2008 | Csik | F16B 37/043 |
| | | | 411/103 |
| 2009/0103997 A1* | 4/2009 | Csik | F16B 39/284 |
| | | | 411/112 |
| 2009/0128983 A1 | 5/2009 | Martin Hernandez | |
| 2013/0336743 A1 | 12/2013 | Hill | |
| 2014/0161559 A1 | 6/2014 | Kim et al. | |
| 2014/0294533 A1 | 10/2014 | Henry | |
| 2015/0345533 A1 | 12/2015 | Hill | |
| 2015/0367954 A1 | 12/2015 | Rebbeck et al. | |
| 2016/0091011 A1* | 3/2016 | Deck | F16B 37/043 |
| | | | 411/112 |
| 2017/0350436 A1* | 12/2017 | Vovan | F16B 37/04 |
| 2021/0048059 A1 | 2/2021 | Grimm et al. | |
| 2021/0071704 A1 | 3/2021 | Ahuja et al. | |

OTHER PUBLICATIONS

International Search Report and Written Opinion on PCT PCT/US2020/049572 dated Dec. 3, 2020.
International Search Report and Written Opinion for PCT/US2021/015549 dated Apr. 20, 2021.

* cited by examiner

NUT CLIP

CROSS REFERENCE TO RELATED APPLICATION

This application claims the benefit of and priority to U.S. Provisional Patent Application No. 62/654,205, filed on Apr. 6, 2018, entitled "NUT CLIP," and incorporated herein by reference in its entirety.

FIELD

The present disclosure relates generally to fasteners, and more specifically, to nut clips.

BACKGROUND

Frequently fasteners are used to join articles together. One such fastener may be a nut clip. Nut clips frequently include a caged nut and a channel. A first article is inserted into the channel and a second article is positioned adjacent to the nut clip. A bolt is inserted through a hole in the second article, through the first article, and received into the caged nut. In this manner, a nut may be readily positioned in frictional communication with the first article, reducing the difficulty of properly orienting the first and second article, as well as inserting the bolt simultaneously. Moreover, nut clips facilitate the use of nuts in connection with bolts where physical impediments limit the ability of tools to reach the nut during tightening of the bolt-nut combination.

SUMMARY

A nut clip is provided. A nut clip may have a clip and a nut.

A clip for a nut clip is provided. The clip may include a main body, a nut retention flange, and a forward reaction wall. The main body may include an aft reaction boss defining at least a portion of a nut containment channel. The nut retention flange may define at least a further portion of the nut containment channel and may be connected to the main body by a nut retention flange attachment member spaced apart from the aft reaction boss. The forward reaction wall may include a portion of the nut retention flange attachment member facing the nut containment channel. The aft reaction boss may include an aft reaction wall, and the aft reaction wall and the forward reaction wall may be configured to be selectably contacted by a nut within the nut containment channel to occlude rotation of the nut.

In various embodiments, the aft reaction wall includes a first aft reaction wall angled segment with a first surface of the aft reaction wall, and a second aft reaction wall angled segment with a second surface of the aft reaction wall and disposed at an angle relative to the first aft reaction wall angled segment.

In various embodiments, the forward reaction wall includes a first forward reaction wall angled segment including a first surface of the forward reaction wall, and a second forward reaction wall angled segment including a second surface of the forward reaction wall and disposed at an angle relative to first forward reaction wall angled segment.

In various embodiments, a first forward reaction wall angled segment projection including a line projected along the first forward reaction wall angled segment is non-intersecting to a first aft reaction wall angled segment projection including a line projected along the first aft reaction wall angled segment. Moreover, a second forward reaction wall angled segment projection including a line projected along the second forward reaction wall angled segment is non-intersecting to a second aft reaction wall angled segment projection including a line projected along the second aft reaction wall segment.

In various embodiments, a first forward reaction wall angled segment projection including a line projected along the first forward reaction wall angled segment intersects a second aft reaction wall angled segment projection including a line projected along the second aft reaction wall angled segment at a left side intersection point outside the edge of the main body.

In various embodiments, a second forward reaction wall angled segment projection including a line projected along the second forward reaction wall angled segment intersects a first aft reaction wall angled segment projection including a line projected along the first aft reaction wall angled segment at a right side intersection point outside the edge of the main body.

In various embodiments, the left side intersection point and the right side intersection point are equidistant from a central longitudinal axis of the main body.

A nut clip is provided. The nut clip may include a clip and a nut. The clip may include a main body. The main body may have an aft reaction boss defining at least a portion of a nut containment channel and having an aft reaction wall. The main body may have a forward reaction wall defining at least a portion of a nut containment channel and spaced apart from the aft reaction wall. The nut may be between the aft reaction wall and the forward reaction wall and may include a first longer side and a second longer side. The first longer side may have a first longer side projection including a line projected in a plane occupied by a central longitudinal axis of the main body and a lateral axis of the main body. The second longer side opposite the first longer side may have a second longer side projection including a line projected in the plane occupied by the central longitudinal axis of the main body and the lateral axis of the main body. The aft reaction wall of the clip may include a first aft reaction wall angled segment and a second aft reaction wall angled segment. The first aft reaction wall angled segment may have a first aft reaction wall angled segment projection including a line projected in the plane occupied by the central longitudinal axis and the lateral axis and corresponding to the first aft reaction wall angled segment. There may be a second aft reaction wall angled segment having a second aft reaction wall angled segment projection including a line projected in the plane occupied by the central longitudinal axis and the lateral axis and corresponding to the second aft reaction wall angled segment. In various embodiments, the forward reaction wall includes a first forward reaction wall angled segment and a second forward reaction wall angled segment. The first forward reaction wall angled segment may have a first forward reaction wall angled segment projection including a line projected in the plane occupied by the central longitudinal axis and the lateral axis and corresponding to the first forward reaction wall angled segment. The second forward reaction wall angled segment may have second forward reaction wall angled segment projection including a line projected in the plane occupied by the central longitudinal axis and the lateral axis and corresponding to the second forward reaction wall angled segment. The first aft reaction wall angled segment may include a first surface of the aft reaction wall, and the second aft reaction wall angled segment may include a second surface of the aft reaction wall at an angle with respect to the first aft reaction wall angled segment. The first forward reaction wall angled segment may include a first surface of the forward reaction wall, and the second forward reaction wall angled segment may include a second surface of the forward reaction wall. In various embodiments, the second longer side edge projection of the second longer side and the first aft reaction wall angled segment projection of the first aft reaction wall angled segment intersect the lateral axis at a first point outside the edges of the main body in response to the nut having a clockwise relation relative to the main body. In various embodiments, the first longer side edge projection of the first longer side and the second forward reaction wall angled segment projection intersect the lateral axis at the first point outside the edges of the main body in response to the nut having a counterclockwise relation relative to the main body.

The second longer side edge projection of the second longer side and the second aft reaction wall angled segment projection of the second aft reaction wall angled segment may intersect the lateral axis at a second point outside the edges of the main body in response to the nut having a counterclockwise relation relative to the main body. The first longer side edge projection of the first longer side and the first forward reaction wall angled segment projection of the first forward reaction wall angled segment may intersect the lateral axis at a second point outside the edges of the main body in response to the nut having a counterclockwise relation relative to the main body.

The first point outside the edges of the main body and the second point outside the edges of the main body may be equidistant from a central longitudinal axis of the main body and on opposite lateral sides of the central longitudinal axis.

The first longer side edge may abut the second aft reaction wall angled segment and the second longer side edge may abut the second forward reaction wall angled segment in response to the nut being in clockwise relation relative to the main body.

In various embodiments, the first longer side edge abuts the first aft reaction wall angled segment and the second longer side edge abuts the first forward reaction wall angled segment in response to the nut being in counterclockwise relation relative to the main body.

Moreover, the first forward reaction wall angled segment and the second forward reaction wall angled segment may be a reflection about the lateral axis of the second aft reaction wall angled segment and the first aft reaction wall angled segment, respectively.

The first forward reaction wall angled segment may be a reflection of the second forward reaction wall angled segment about a central longitudinal axis of the main body.

The first aft reaction wall angled segment may be a reflection of the second aft reaction wall angled segment about a central longitudinal axis of the main body.

A method of forming a clip for a for a nut clip is provided. The method may include providing a main body including an aft reaction boss defining at least a portion of a nut containment channel. The method may include providing a nut retention flange defining at least a further portion of the nut containment channel and connected to the main body by a nut retention flange attachment member spaced apart from the aft reaction boss. The method may include providing a forward reaction wall including portion of the nut retention flange attachment member facing the nut containment channel. In various embodiments, the aft reaction boss includes an aft reaction wall, and the aft reaction wall and the forward reaction wall are configured to be selectably contacted by a nut within the nut containment channel to occlude rotation of the nut.

The method of forming the clip for the nut clip may further include wherein the aft reaction wall includes a first aft reaction wall angled segment including a first surface of the aft reaction wall, a second aft reaction wall angled segment including a second surface of the aft reaction wall and disposed at an angle relative to the first aft reaction wall angled segment. The method may further include wherein the forward reaction wall includes a first forward reaction wall angled segment including a first surface of the forward reaction wall, and a second forward reaction wall angled segment including a second surface of the forward reaction wall and disposed at an angle relative to first forward reaction wall angled segment.

In various embodiments, a first forward reaction wall angled segment projection includes a line projected along the first forward reaction wall angled segment that is non-intersecting to a first aft reaction wall angled segment projection including a line projected along the first aft reaction wall angled segment. In various embodiments, a second forward reaction wall angled segment projection includes a line projected along the second forward reaction wall angled segment that is non-intersecting to a second aft reaction wall angled segment projection that includes a line projected along the second aft reaction wall.

The method of forming the clip for the nut clip may include wherein a first forward reaction wall angled segment projection including a line projected along the first forward reaction wall angled segment intersects a second aft reaction wall angled segment projection including a line projected along the second aft reaction wall angled segment at a left side intersection point outside the edge of the main body. The method may include wherein a second forward reaction wall angled segment projection including a line projected along the second forward reaction wall angled segment intersects a first aft reaction wall angled segment projection including a line projected along the first aft reaction wall angled segment at a right side intersection point outside the edge of the main body.

The method of forming the clip for the nut clip may include wherein the left side intersection point and the right side intersection point are equidistant from a central longitudinal axis of the main body.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

To be oriented "outward" of an object means having a position farther from a shared reference point than the object. For example, to be outward of a longitudinal axis relative to an object means having a distance from the longitudinal axis, a lateral vector component of which is greater than that of a corresponding lateral vector component of the distance of the object from the shared longitudinal axis.

Similarly, as used herein a "direction" and an "opposing direction" comprise directions having a vector component extending at least partially in opposite directions, such as wherein the statement pointing in a "first direction" means having a vector component extending at least partially opposite an "opposing second direction."

Figure 1:
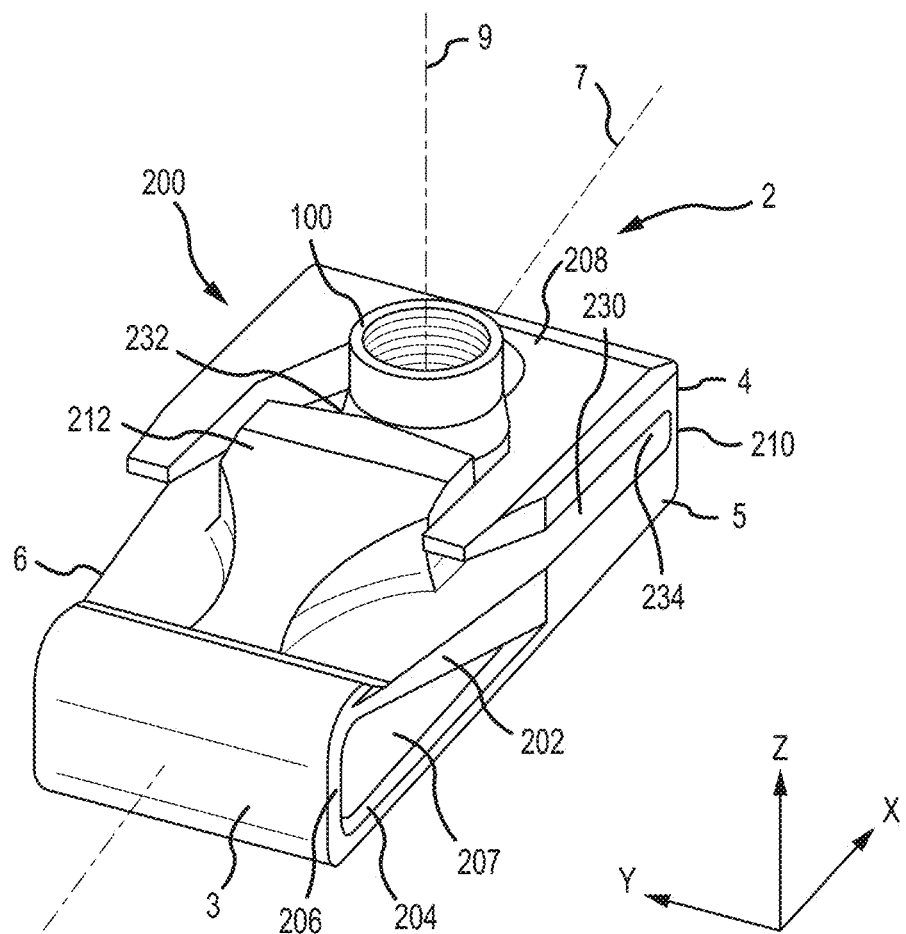
FIG. 1 illustrates a view of an example nut clip having both a clip and a nut, according to various embodiments.
Figure 13:
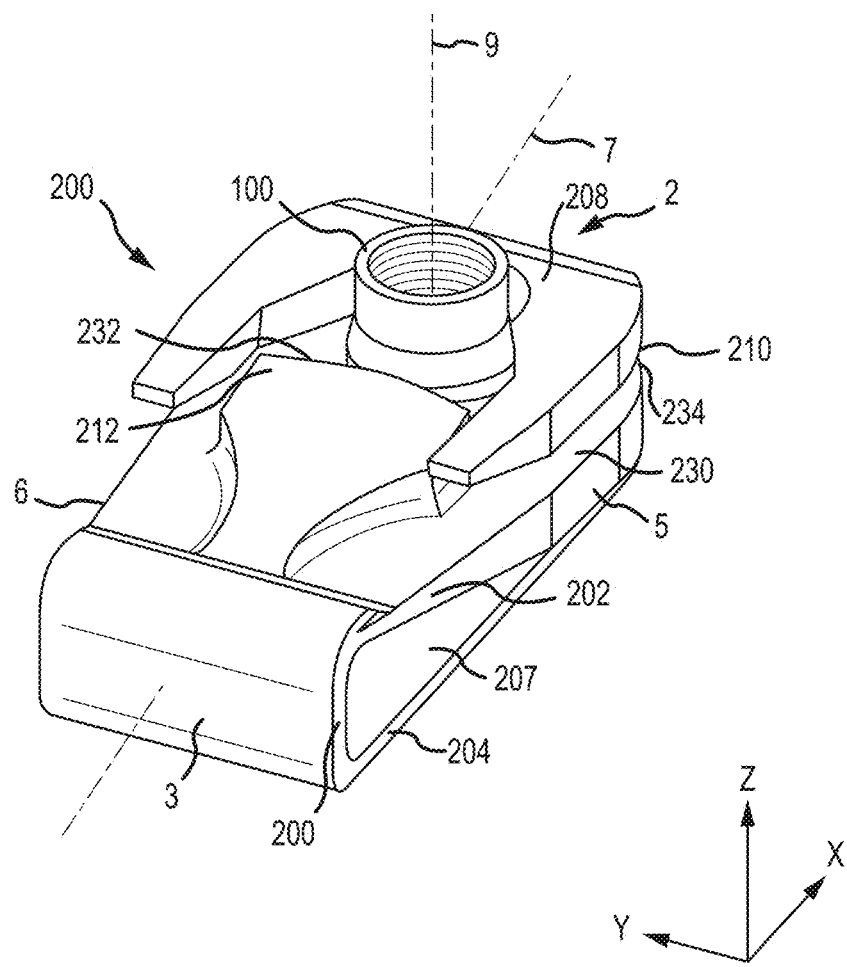
FIG. 13 illustrates a view of a further example nut clip having both a clip and a nut, according to various embodiments.

With reference to FIGS. 1 and 13, a nut clip 2 may comprise a clip 200 and a nut 100. The clip 200 may comprise various further aspects configured to receive articles to be joined together. For instance, the clip 200 may be configured to retain a nut 100 in mechanical communication with the clip 200 and may comprise a collection of flanges arranged to engage in mechanical communication with a first article and to be adjacent to a second article. The nut 100 may receive and secure a fastener inserted through the first article and the second article. Thus the clip 200 and nut 100 work in concert to facilitate joining of a first and second article, as well as retention of the nut 100 proximate to the first article and permitting tightening of the fastener relative to the nut 100, without further use of tools to position the nut 100 during tightening.

Continuing in reference to FIGS. 1 and 13, the clip 200 is, in various embodiments, a single piece of material. In further embodiments, the clip 200 comprises multiple pieces joined together. The pieces may be joined by welding, gluing, bonding, brazing or any other affixment mechanism as desired.

A clip 200 may comprise edges. Throughout the discussion of the clip 200, reference will be made to various edges, such as to provide orientation. For instance, with continuing reference to FIGS. 1 and 13, but additional reference to FIGS. 10A, 11A, 19A, and 20A, a clip 200 may include a forward edge 4, an aft edge 3, a first side 5, and a second side 6.

The forward edge 4 of the clip 200 may comprise a distal surface of the clip 200 disposed at one extreme end of the clip 200 along a longer axis, such as a central longitudinal axis 7 of the clip 200. The forward edge 4 may coincide with a positive-most point along an X-axis as illustrated in the Figures. Thus, the forward edge 4 may lie in a Y-Z plane, distally disposed along the X-axis relative to all other features of the clip 200. In various embodiments, the forward edge 4 of the clip 200 coincides with a forward reaction wall 234 (FIGS. 1, 5A, 9A, 10A, 10B, 11A, 11B, 13, 17A, 18A, 19A, 19B, 20A, and 20B) of the clip 200.

The aft edge 3 of the clip 200 may comprise a distal surface of the clip 200 disposed at another extreme end of the clip 200 along a longer axis, such as a central longitudinal axis 7 of the clip 200. The another extreme end may be opposite that associated with the forward edge 4. The aft edge 3 may coincide with a negative-most point along an X-axis as illustrated in the Figures. Thus, the aft edge 3 may lie in a Y-Z plane, distally disposed along the X-axis relative to all other features of the clip 200 and opposite the forward edge 4. In various embodiments, the aft edge 3 of the clip 200 coincides with a lower flange attachment member 206.

With reference to FIGS. 1, 10A, 11A, 13, 19A, and 20A, the first side 5 may comprise a distal surface of the clip 200 disposed at one extreme end of the clip 200 along a shorter axis. The first side 5 and the second side 6 may comprise opposite sides of the clip 200 along the shorter axis. The shorter axis may in various embodiments be perpendicular to a longer axis, such as a central longitudinal axis 7. The first side 5 may coincide with a negative-most point along a Y-axis as illustrated in the Figures. Thus, the first side 5 may lie in a Z-X plane, distally disposed along the Y-axis relative to other features of the clip 200. In various embodiments, the first side 5 of the clip 200 extends along a side of the main body 202 (FIGS. 1, 2, 4A, 13, 14, 16A). For example, the first side 5 of the clip 200 may extend from the forward reaction wall 234 (FIGS. 1, 5A, 9A, 10A, 10B, 11A, 11B, 13, 17A, 18A, 19A, 19B, 20A, and 20B) to the lower flange attachment member 206 along the entire length of the main body 202.

The second side 6 may comprise a distal surface of the clip 200 disposed at one extreme end of the clip 200 along a shorter axis. The second side 6 may comprise an opposite side of the clip 200 relative to the first side 5. The shorter axis may be perpendicular to a longer axis, such as a central longitudinal axis 7. The second side 6 may coincide with a positive-most point along a Y-axis as illustrated in the Figures. Thus, the second side 6 may lie in a Z-X plane, distally disposed along the Y-axis relative to other features of the clip 200. In various embodiments, the second side 6 of the clip 200 extends along a side of the main body 202. For example, the second side 6 of the clip 200 may extend from the forward reaction wall 234 (FIGS. 1, 5A, 9A, 10A, 10B, 11A, 11B, 13, 17A, 18A, 19A, 19B, 20A, and 20B) to the lower flange attachment member 206 along the entire length of the main body 202.

The second side 6 and the first side 5 may both extend from the forward reaction wall 234 (FIGS. 1, 5A, 9A, 10A, 10B, 11A, 11B, 13, 17A, 18A, 19A, 19B, 20A, and 20B) to the lower flange attachment member 206 along the entire length of the main body 202. Thus, and with reference to FIGS. 1, 2, 4A, 10A, 11A, 13, 14, 16A, 19A, and 20A, in various instances the second side 6 and the first side 5 may comprise outermost lateral edges bounding the main body 202 and the forward edge 4 and the aft edge 3 may comprise outermost longitudinal edges bounding the main body 202.

In addition, axes may be defined with respect to the clip 200 and as illustrated in the Figures. For example, FIGS. 1, 2, 5A-B, 9A-B, 10A-C, 11A-C, 13, 14, 17A-B, 18A-B, and 20A-C depict a central longitudinal axis 7 extending through both the forward edge 4 and the aft edge 3 of the clip 200, passing in a centered relation through the entire nut clip 2 longitudinally and defining a central axis lying in the Z-X plane and extending in an X-direction. In various instances, the central longitudinal axis 7 is equidistant from the first side 5 and the second side 6 at each point along its length. For instance, if a series of Z-Y planes established a series of section views of a clip 200, each at a different location along the X axis, the distance between the point coinciding with the central longitudinal axis 7 and the first side 5 would be equal to the distance between the point coinciding with the central longitudinal axis 7 and the second side 6.

Further axes may be defined with respect to the clip 200 and as illustrated in the Figures. For example, FIGS. 1, 3, 4A, 4B, 6, 8, 9B, 10B-C, 11B-C, 13, 15, 16A, 16B, 18B, 19B-C, and 20B-C each depict a fastener insertion axis 9. A fastener insertion axis 9 may extend through both the clip 200 and a nut 100 and may coincide with the path of a bolt when threaded into the nut 100 for fastening articles together. In various embodiments, the fastener insertion axis 9 is centered within the cylindrical channel of the nut 100 into which a bolt extends and the fastener insertion axis 9.

The clip 200 may comprise a variety of structural aspects, many of which will be discussed below. FIGS. 1, 2, 4A, 13, 14, and 16A depict the main body 202 of the clip 200. The main body 202 comprises a flange extending from the lower flange attachment member 206 proximate to the aft edge 3 along the central longitudinal axis 7 to the nut retention flange 208 proximate to the forward edge 4. The main body 202 comprises the flange further extending between and defining the first side 5 and the second side 6. Moreover, an aft reaction boss 212, discussed further herein may extend from a surface of the flange outwardly along a Z-axis as shown in the Figures. In various embodiments, the main body 202 comprises a constant thickness flange. In further embodiments, the main body 202 comprises a variable thickness flange, for instance, a flange having localized thickening and/or thinning to ameliorate bending, overstressing, excessive weight, and other potential aspects.

With specific focus on FIGS. 1, 4A, 13, and 16A, the clip 200 may comprise a lower flange 204. A lower flange 204 may lie in a plane that, when decomposed into two vectors and a point, one may appreciate that at least one of the two vectors may itself decompose into Y and X vectors. Thus, the lower flange 204 may be substantially parallel to the main body 202. In further instances, the lower flange 204 may be disposed at an acute angle with respect to the main body 202. The lower flange 204 joins to the main body 202 by the lower flange attachment member 206, cantilevering away from the lower flange attachment member 206 in a direction of at least a vector component of the central longitudinal axis 7. As such, a fastening channel 207 is defined between the cantilevered lower flange 204 and the main body 202. Consequently, the lower flange 204 and the main body 202 provide a fastening channel 207 for the insertion of an article whereby the clip 200 may mechanically communicate with the article, such as along an edge. In addition, one may appreciate that the edge of the article may rest at least partially against the lower flange attachment member 206, which may provide a floor of the fastening channel 207.

The clip 200 also comprises a fastening channel 207, which was briefly mentioned above. A fastening channel 207 comprises a space defined between the main body 202, such as, a contact face 267 and/or relief face 268 of the main body 202 at the one end along the fastener insertion axis 9, and a surface of the lower flange 204 at the other. The space is further defined between the first side 5 and the second side 6 of the clip 200. The space is yet further defined at the one end along the central longitudinal axis 7 by the lower flange attachment member 206 and cantilevers therefrom. The fastening channel 207 may comprise any space defined by aspects of at least the main body 202 and the lower flange 204 configured to receive an article between the main body 202 and the lower flange 204 in mechanical communication, such as for fastening by the nut clip 2 to another article.

Also as briefly mentioned, the nut clip 2 may comprise a lower flange attachment member 206. The lower flange attachment member 206 comprises a flange disposed in a plane that is at least partially transverse to a plane occupied by at least a portion of the main body 202. The lower flange attachment member 206 cantilevers from the main body 202, and the lower flange 204 cantilevers from the lower flange attachment member 206. In various embodiments, the lower flange attachment member 206 lies in a plane that passes through a plane that the main body 202 lies in and that also passes through a plane that the lower flange 204 lies in. In various embodiments, the combination of the lower flange attachment member 206, with the main body 202 attached proximate to its first distal end, and with the lower flange 204 attached proximate to its second distal end, forms an approximate U-shape defining at least a portion of the fastening channel 207. Thus, it may be said that the lower flange attachment member 206 comprises a floor of the fastening channel 207, and it may be said that the lower flange attachment member 206 comprises a flange in mechanical communication with the main body 202 proximate to first distal end and in mechanical communication with the lower flange 204 at a second distal end opposite the first distal end.

The nut clip 2 may also comprise a nut retention flange 208. The nut retention flange 208, as depicted in at least FIGS. 1, 2, 13 and 14, may comprise a flange configured to retain a nut 100 in mechanical communication with the clip 200. Thus the nut retention flange 208 may be said to cage the nut 100 of the nut clip 2. The nut retention flange 208 may be disposed outwardly of the main body 202 along a fastener insertion axis 9. The nut retention flange 208 may be disposed opposite the lower flange 204, so that the main body 202 is disposed between the nut retention flange 208 and the lower flange 204. In this manner, the nut 100 may be caged on one side of the main body 202, and an article to be fastened may be inserted into the fastening channel 207 disposed at an opposite side of the main body 202, wherein the main body 202 may be compressively loaded by the tightening of a fastener in the nut 100. In various embodiments, the nut retention flange 208 cantilevers from a nut retention flange attachment member 210.

Having discussed the nut retention flange 208 and its role generally, a specific discussion of aspects of the nut retention flange 208 and related features follows below. With reference to FIGS. 1, 2, 13, and 14, in various instances, the clip 200 may comprise a nut retention flange 208. A nut retention flange 208 may lie in a plane that, when decomposed into two vectors and a point, one may appreciate that at least one of the two vectors may itself decompose into Y and X vectors. Thus, the nut retention flange 208 may be substantially parallel to the main body 202. In further instances, the nut retention flange 208 may be disposed at an acute angle with respect to the main body 202. The nut retention flange 208 joins to the main body 202 by the nut retention flange attachment member 210, cantilevering away from the nut retention flange attachment member 210 in a direction of at least a vector component of the central longitudinal axis 7. As such, a nut containment channel 230 depicted in FIGS. 1, 3, 5A, 13, 15, and 17A, is defined between the cantilevered nut retention flange 208 and the main body 202. Consequently, the nut retention flange 208 and the main body 202 provide a nut containment channel 230 for the capture of a caged nut 100 whereby the clip 200 may mechanically communicate with a fastener inserted through the caged nut 100. In addition, one may appreciate that the nut retention flange attachment member 210 may provide a forward reaction wall 234 (FIGS. 1, 5A, 9A, 10A-C, 11A-C, 13, 17A, 9A, 19A-C, and 20A-C) which may bound at least a portion of the nut containment channel 230.

The clip 200 also comprises a nut containment channel 230, which was briefly mentioned above. A nut containment channel 230 comprises a space defined between the main body 202, such as at the one end along the fastener insertion axis 9, and the nut retention flange 208 at the other end along the fastener insertion axis 9. The space is further defined between the first side 5 and the second side 6 of the clip 200. The space is yet further defined at the one end along the central longitudinal axis 7 by the nut retention flange attachment member 210 and cantilevers therefrom. The nut containment channel 230 may comprise any space defined by aspects of at least the main body 202 and the nut retention flange 208 configured to capture a caged nut 100 the main body 202 and the nut retention flange 208 in mechanical communication, such as for fastening by the nut clip 2 to another article.

Also as briefly mentioned, the nut clip 2 may comprise a nut retention flange attachment member 210 shown in FIGS. 1 and 13. The nut retention flange attachment member 210 comprises a flange disposed in a plane that is at least partially transverse to a plane occupied by at least a portion of the main body 202. The nut retention flange attachment member 210 cantilevers from the main body 202 and the nut retention flange 208 cantilevers from the nut retention flange attachment member 210. In various embodiments, the nut retention flange attachment member 210 lies in a plane that passes through a plane that the main body 202 lies in and that also passes through a plane that the nut retention flange 208 lies in. In various embodiments, the combination of the nut retention flange attachment member 210, with the main body 202 attached proximate to its first distal end, and with the nut retention flange 208 attached proximate to its second distal end, forms an approximate U-shape defining at least a portion of the nut containment channel 230. Thus, it may be said that the nut retention flange attachment member 210 comprises a floor of the nut containment channel 230, such as the forward reaction wall 234 (FIGS. 1, 5A, 9A, 10A-C, 11A-C, 13, 15, 18A, 19A-C, and 20A-C), and it may be said that the nut retention flange attachment member 210 comprises a flange in mechanical communication with the main body 202 proximate to first distal end and in mechanical communication with the nut retention flange 208 at a second distal end opposite the first distal end.

Focusing attention now on FIGS. 1, 3, 5A, 13, 15, and 17A, the clip 200 of nut clip 2 further comprises an aft reaction boss 212. The aft reaction boss 212 comprises a boss on a surface of the main body 202. In various embodiments, the aft reaction boss 212 extends outwardly from the main body 202 along a vector at least partially toward the nut retention flange 208. For example, the aft reaction boss 212 may extend outward along a normal vector of a surface of the main body 202. In various instances, such a normal vector may comprise at least one vector component, one of the at least one vector component extending parallel to the nut retention flange attachment member 210. The aft reaction boss 212 may define a constraint on the movement of a nut 100 caged within the nut containment channel 230 (FIGS. 1, 4A, 5A, 16A, and 17A). Thus the aft reaction boss 212 may at least partially define the nut containment channel 230. For example, the forward reaction wall 234 (FIGS. 1, 5A, 9A, 10A-C, 11A-C, 13, 17A, 18A, 19A-C, and 20A-C) and the aft reaction boss 212 (FIGS. 1, 3, 5A, 13, 15, and 17A) may define opposite ends of a nut containment channel 230. Thus, along an X-axis, the nut containment channel 230 may be defined by a forward reaction wall 234 (FIGS. 1, 5A, 9A, 10A-C, 11A-C, 13, 17A, 18A, 19A-C, and 20A-C) of the clip 200 at a positive-most X-axis position, and may be defined by an aft reaction boss 212 (FIGS. 1, 3, 5A, 13, 15, and 17A), and specifically, an aft reaction wall 232 (FIGS. 1, 5A, 9A, 10A-C, 11A-C, 13, 17A, 18A, 19A-C, and 20A-C) of the aft reaction boss 212 (FIGS. 1, 3, 5A, 13, 15, and 17A) at a negative-most X-axis position.

In various embodiments, with reference to FIGS. 1, 3, 5A, 13, 15, and 17A, the aft reaction boss 212 may extend outwardly away from the main body 202 in a direction of the fastener insertion axis 9, for instance, in a Z-axis direction. The aft reaction boss 212 may extend a distance corresponding to the extent of at least a portion of the nut retention flange 208 away from the main body 202. Thus, a top surface of the aft reaction boss 212 may lie at least partially in a same plane, such as a same Y-X plane, as a top surface of the nut retention flange 208. In further embodiments, the aft reaction boss 212 extends a distance greater than the extent of at least a portion of the nut retention flange 208 away from the main body 202. Thus a top surface of the aft reaction boss 212 may lie at least partially in a plane, such as a Y-X plane outward of a plane in which the top surface of the nut retention flange 208 at least partially lies. Further specific features of the aft reaction boss 212 will be detailed later herein, following the completion of the discussion of various aspects of the clip 200.

Finally, and with reference to FIGS. 1, 2, 3, 13, 14, and 15, the clip 200 may define a transverse fastener passage 214. A transverse fastener passage 214 may be a space defined by at least a part of the main body 202, at least a part of the lower flange 204, and in various embodiments, at least a part of the nut retention flange 208, through which a bolt inserted into the nut 100 may extend. Thus, as the bolt is tightened in the nut 100, a compressive load aligned along the axis of the bolt may be exerted across the transverse fastener passage 214. In this manner, the nut clip 2 may be loaded in compression, such as when joining articles together. The transverse fastener passage 214 may comprise a main body aperture 216. The main body aperture 216 may comprise an aperture defined through the main body 202 configured to receive a fastener for insertion into a nut 100. Moreover, the transverse fastener passage 214 may comprise a lower flange aperture 218. The lower flange aperture 218 may comprise an aperture defined through the lower flange 204 configured to receive a fastener for insertion into a nut 100.

Figure 4A:
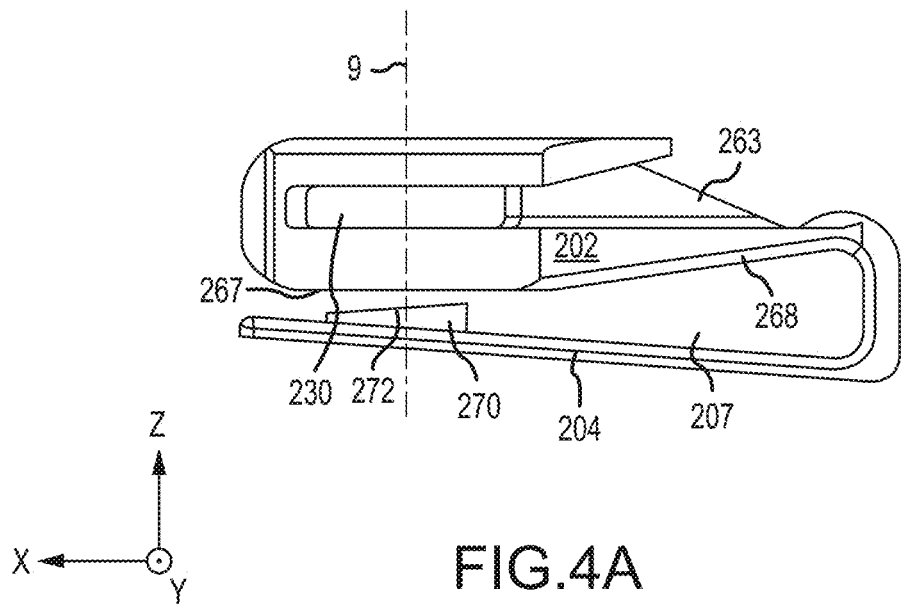
FIG. 4A illustrates a side view of an example clip of a nut clip, in accordance with various embodiments.
Figure 4B:
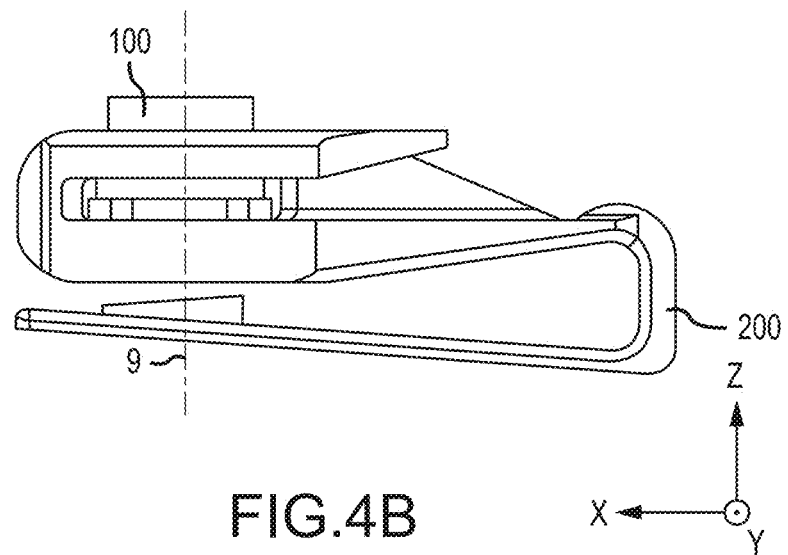
FIG. 4B illustrates an example side view of an example combination of nut and clip of a nut clip, in accordance with various embodiments.
Figure 16A:
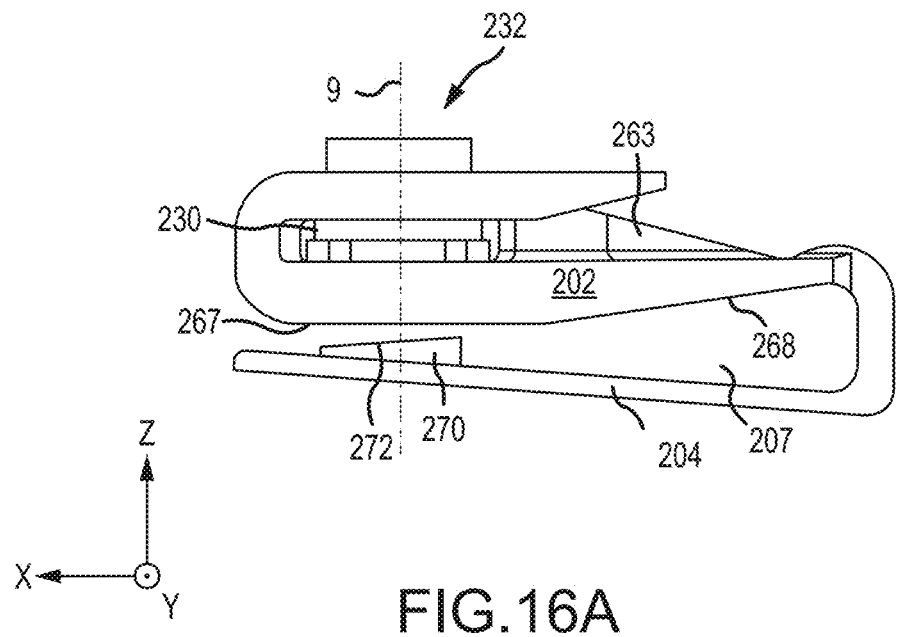
FIG. 16A illustrates a side view of the further example clip of a nut clip, in accordance with various embodiments.
Figure 16B:
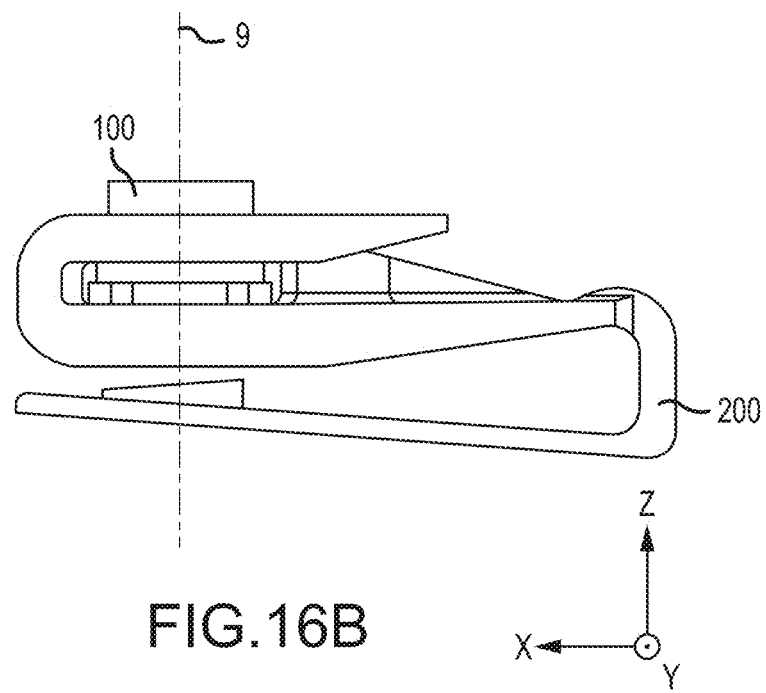
FIG. 16B illustrates an example side view of the further example combination of nut and clip of a nut clip, in accordance with various embodiments.

The discussion of the specific components of the clip 200 is now complete. Attention will now be directed to aspects of each such specific component. For instance, the main body 202 of the clip 200 has been introduced with reference to FIGS. 1, 2, 4A, 13, 14, and 16A. Attention is now directed to FIGS. 4A and 16A, for a discussion of specific features of the main body 202.

In various embodiments, a main body 202 comprises a contact face 267. A contact face 267 may comprise a surface of the main body 202 defining a boundary of the fastening channel 207. In various instances, the contact face 267 is a planar face oriented to contact a planar article inserted into the fastening channel 207 for attachment of the nut clip 2 thereto. For instance, the contact face 267 may be a parallel plane of an article inserted into the fastening channel 207. In various instances, the contact face 267 is a planar face oriented to compressively squeeze against an article inserted into the fastening channel 207 to enhance frictional engagement therewith.

The main body 202 may also comprise a relief face 268. A relief face 268 may comprise a surface of the main body 202 defining a boundary of the fastening channel 207. In various instances the relief face 268 is a planar face oriented at an angle with respect to the contact face 267. The relief face 268 may comprise a planar surface oriented at an angle with respect to a plane of an article inserted into the fastening channel 207. In this manner, the relief face 268 may define a surface of a portion of the main body 202 oriented to springably press the contact face 267 against an article inserted into the fastening channel 207. At points along the X-axis extending away from the contact face 267, toward the lower flange attachment member 206, the relief face 268 may have increasing Z-axis elevation away from a (e.g., outwardly of) the contact face 267. A relief area may be provided so that the article inserted into the fastening channel 207 and contactable by the contact face 267 does not contact the relief face 268, and further, the relief face 268 facilitates a spring-loading of the contact face 267 whereby the relief face 268 is biased toward the lower flange 204 to press the contact face 267 into an article inserted into the fastening channel 207.

Attention is now redirected toward the lower flange 204 and FIGS. 1, 4A, 13, and 16A. In various embodiments, the lower flange 204 comprises a locating ring 270. A locating ring 270 comprises a boss, detent, protrusion, and/or any other feature of the lower flange 204 configured to provide a raised aspect insertable into a corresponding space, aperture, or the like of an article inserted into the fastening channel 207. Thus, the locating ring 270 may be raised along a Z-axis direction (e.g., parallel to the fastener insertion axis 9 (FIGS. 1, 3, 4A, 4B, 6, 8, 9B, 10B-C, 11B-C, 13, 15, 16A, 16B, 18B, 19B-C, and 20B-C) into the fastening channel 207. The locating ring 270 may comprise a localized elevation of a surface of the lower flange 204 at least partially normal to a surface of the lower flange 204. While the locating ring 270 is in various embodiments an annular wedge, in further instances, the locating ring 270 may be any shape as desired. FIGS. 4A and 16A depict a locating ring 270 comprising an annular wedge, wherein a distal cantilevered end of the locating ring 270 comprises a locating ring ramp face 272. The locating ring ramp face 272 comprises a ramp configured to progressively compress against an article as it is inserted into the fastening channel 207, enhancing an overcentered, or snapping effect as the locating ring ramp face 272 aligns with an aperture, space, or the like in an article and upon such alignment, inserts into the aperture, space, or the like, in order to directionally register the locating ring 270 of the lower flange 204 with respect to an aperture, space, or the like of an article inserted into the fastening channel 207.

Attention is now redirected to the nut retention flange 208 and corresponding FIGS. 1, 2, 13 and 14. The nut retention flange 208 may comprise further structural members. For instance, the nut retention flange 208 may comprise a continuous flange bounding the nut 100 in at least one degree of freedom of movement, such as in a positive Z-axis direction. However, in further embodiments, the nut retention flange 208 comprises spaced apart members, so that in addition to bounding the nut 100 in at least one degree of freedom of movement, such as in a positive Z-axis direction and/or parallel to a fastener insertion axis 9 (FIGS. 1, 3, 4A, 4B, 6, 8, 9B, 10B-C, 11B-C, 13, 15, 16A, 16B, 18B, 19B-C, and 20B-C) and/or normal to the main body 202 and/or nut retention flange 208, the nut retention flange 208 may also permit aspects of the nut 100 to be extensible through and/or outward of the nut retention flange 208, and potentially constraining further degrees of freedom of movement. For instance, a nut retention flange 208 may comprise a plurality of guard members, with aspects of the nut 100 extending between the guard members, so that lateral movement of the nut 100 such as in a positive and negative Y-axis direction (e.g., toward and away from first side 5 and/or second side 6 of the clip 200) is also constrained.

With reference to FIGS. 1, 2, 5A, 10A, 11A, 13, 14, 17A, 19A, and 20A, a nut retention flange 208 may comprise a first aft extending guard member 220 and a second aft extending guard member 222. In various instances, the first and second aft extending guard members 220, 222 extend away from the nut retention flange attachment member 210, cantilevered at least partially parallel, or at an acute angle with respect to, the main body 202. The first and second aft extending guard members 220, 222 extend toward the aft edge 3 of the clip 200, and in concert with the aft reaction boss 212, retain the nut 100 in caged relation between the nut retention flange 208 and the main body 202, and further, between the first aft extending guard member 220 and the second aft extending guard member 222.

In various embodiments, a first aft extending guard member 220 comprises a cantilevered flange extending proximate to the second side 6 of the clip 200, and the second aft extending guard member 222 comprises a cantilevered flange extending proximate to the first side 5 of the clip 200. Inward edges of the first aft extending guard member 220 and the second aft extending guard member 222 may flank an aspect of the nut 100 and constrain movement of the nut 100 toward and away from the first side 5 and second side 6. Further discussion of each of the first aft extending guard member 220 and second aft extending guard member 222 will continue below with respect to further important aspects thereof.

Turning attention to the aft reaction boss 212, and the aft reaction wall 232 of the aft reaction boss 212, reference to FIGS. 1, 3, 5A, 9A, 10A-B, 10A-C, 11A-C, 13, 15, 17A, 18A, 19A-B, and 20A-C clarifies specific features of this aspect of clip 200. For instance, an aft reaction wall 232, which has been explained to provide a constraint on at least one degree of freedom of movement of a nut 100, may have a specific arrangement of segments to effectuate different constraining effects on the nut 100. Less specifically however, the aft reaction wall 232 comprises a surface of the aft reaction boss 212 facing toward the nut containment channel 230. The aft reaction wall 232 selectably contacts a nut 100 disposed within the nut containment channel 230 to limit its movement. The aft reaction wall 232 extends generally in a Y-X plane transversely toward the first side 5 and second side of the clip 200. In various embodiments, the aft reaction wall 232 extends partially across the main body 202 between the first side 5 and second side 6 of the clip 200 but does not extend all the way to the first side 5 and/or all the way to the second side 6. In various instances, the aft reaction wall 232 lies between inward edges of the first aft extending guard member 220 and second aft extending guard member 222 of the nut retention flange 208. Furthermore, the aft reaction wall 232 may be closer to the nut retention flange attachment member 210 than is the first guard member distal edge 224 associated with the first aft extending guard member 220 and similarly, the second guard member distal edge 225 associated with the second aft extending guard member 222. The aft reaction wall 232 may be shaped to correspond to features of the nut 100 and selectably contact features of the nut 100 to react forces exerted by the nut 100 during use.

The aft reaction boss 212 further comprises a first reaction boss lateral side 257. A first reaction boss lateral side 257 comprises a first laterally outermost side of the aft reaction boss 212, meaning a side of the aft reaction boss 212 closest to the second side 6 of the nut clip 2. The first reaction boss lateral side 257 may comprise a planar wall in a Y-Z plane running in a direct parallel to the central longitudinal axis 7. While in some embodiments, the first reaction boss lateral side 257 is coincident with the second side 6 of the nut clip 2, in further embodiments, the first reaction boss lateral side 257 is inward of the second side 6 relative to the central longitudinal axis 7, and thus, the first reaction boss lateral side 257 extends normal to a surface of the main body 202.

The aft reaction boss 212 further comprises a second reaction boss lateral side 259. A second reaction boss lateral side 259 comprises a second laterally outermost side of the aft reaction boss 212. Thus one may appreciate that the second reaction boss lateral side 259 is a side of the aft reaction boss 212 closest to the first side 5 of the nut clip 2. The first reaction boss lateral side 257 and second reaction boss lateral side 259 may comprise opposite sides of the aft reaction boss 212 and may be parallel planes, though in further instances, may have any arbitrary shape as desired. The second reaction boss lateral side 259 may comprise a planar wall in a Y-Z plane running in a direction parallel to the central longitudinal axis 7. While in some embodiments, the second reaction boss lateral side 259 is coincident with the first side 5 of the nut clip 2, in further embodiments the second reaction boss lateral side 259 is inward of the first side 5 relative to the central longitudinal axis 7; and thus, the second reaction boss lateral side 259 extends normal to a surface of the main body 202.

Finally, the aft reaction boss 212 comprises a strengthening ramp 263, as shown in FIGS. 3, 4A, 15, and 16A. A strengthening ramp 263 comprises an inclined plane portion extending outwardly normal from the main body 202 and declining away from the aft reaction wall 232 along the central longitudinal axis 7 toward the aft edge 3 of the clip 200 and/or toward the lower flange attachment member 206. Thus the strengthening ramp 263 comprises a triangular boss buttressing the aft reaction wall 232. In further instances, the ramp comprises a curved ramp, rather than an inclined plane and sweeps arcuately from the aft reaction wall 232 proximate to the outermost portion of the wall relative to the Z-axis and/or fastener insertion axis 9, toward the plane of the surface of the main body 202.

Figure 5A:
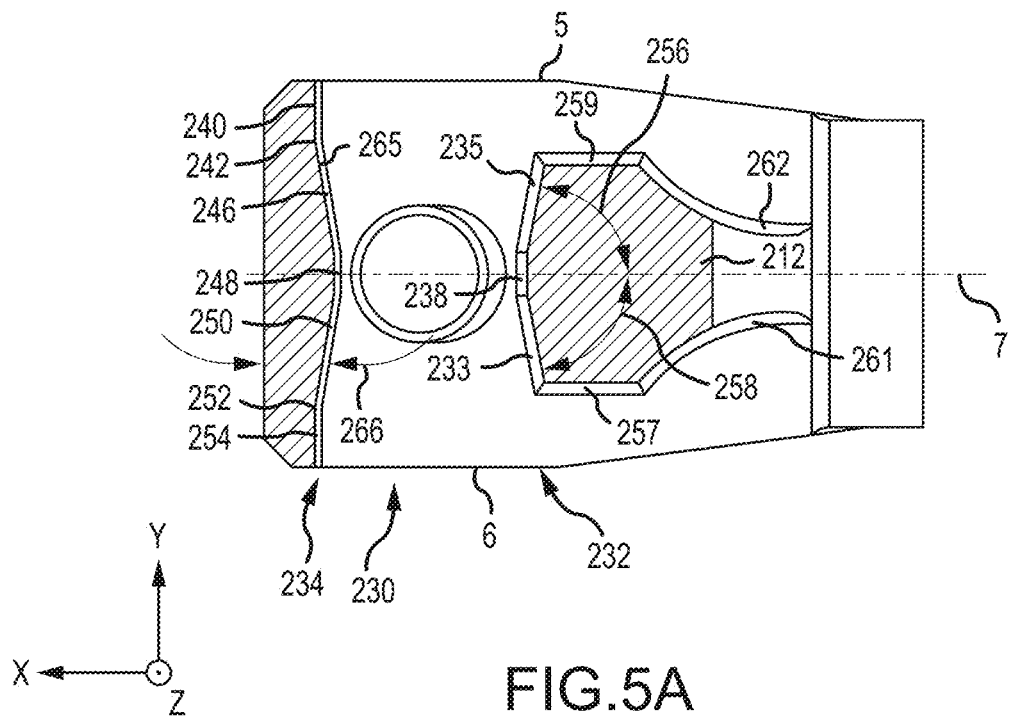
FIG. 5A illustrates a top section view of an example clip of a nut clip, in accordance with various embodiments.
Figure 5B:
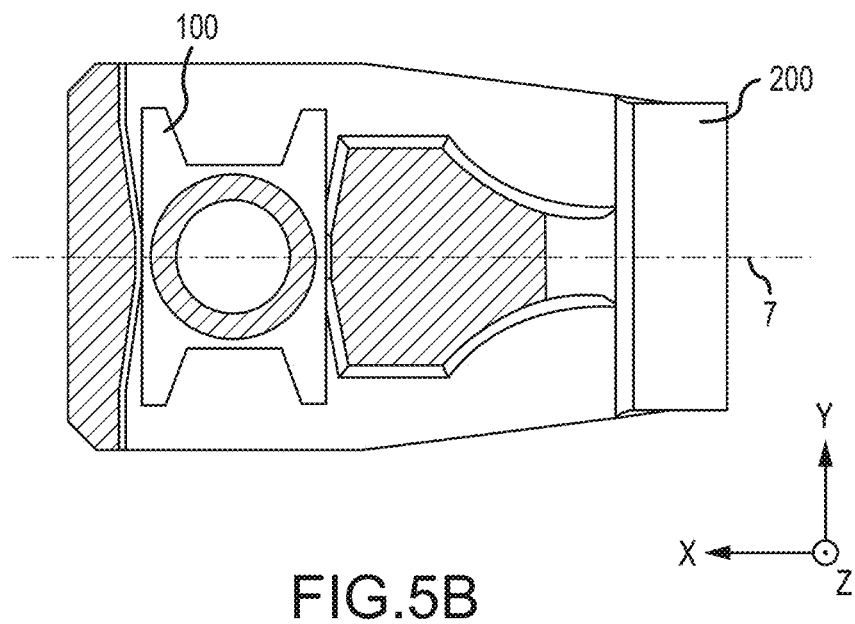
FIG. 5B illustrates a top section view of an example combination of nut and clip of a nut clip, in accordance with various embodiments.
Figure 6:
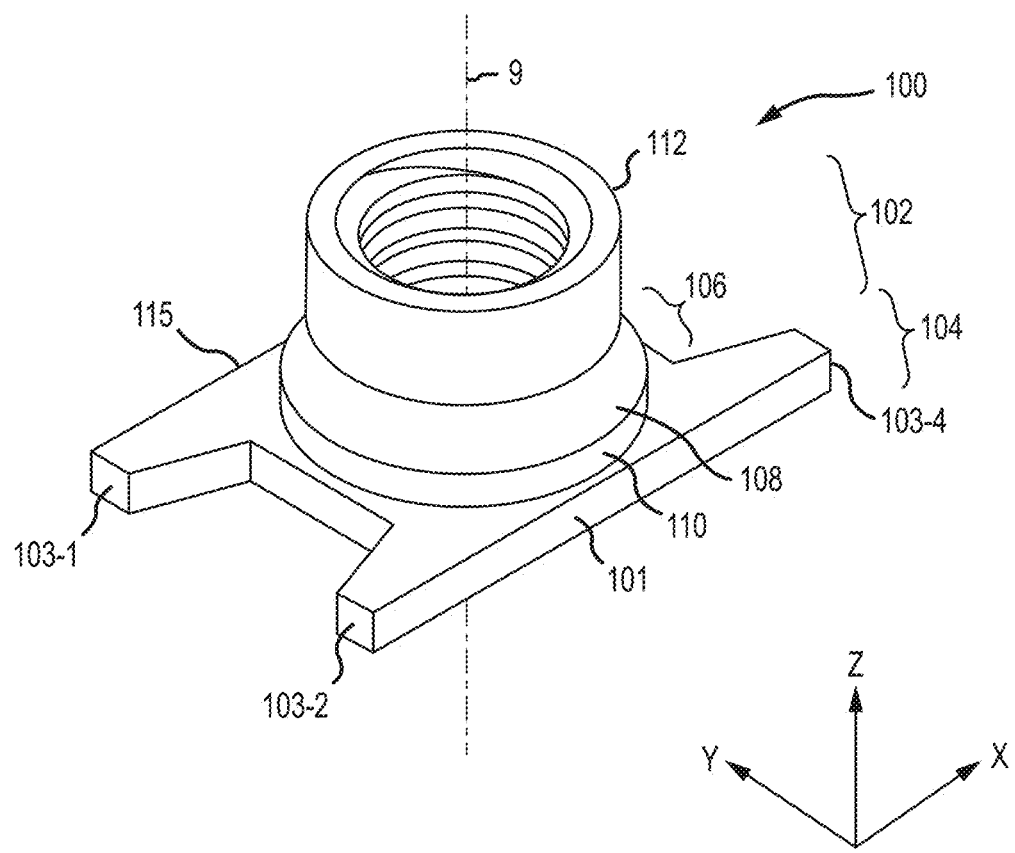
FIG. 6 illustrates a view of an example nut of a nut clip, in accordance with various embodiments.
Figure 7:
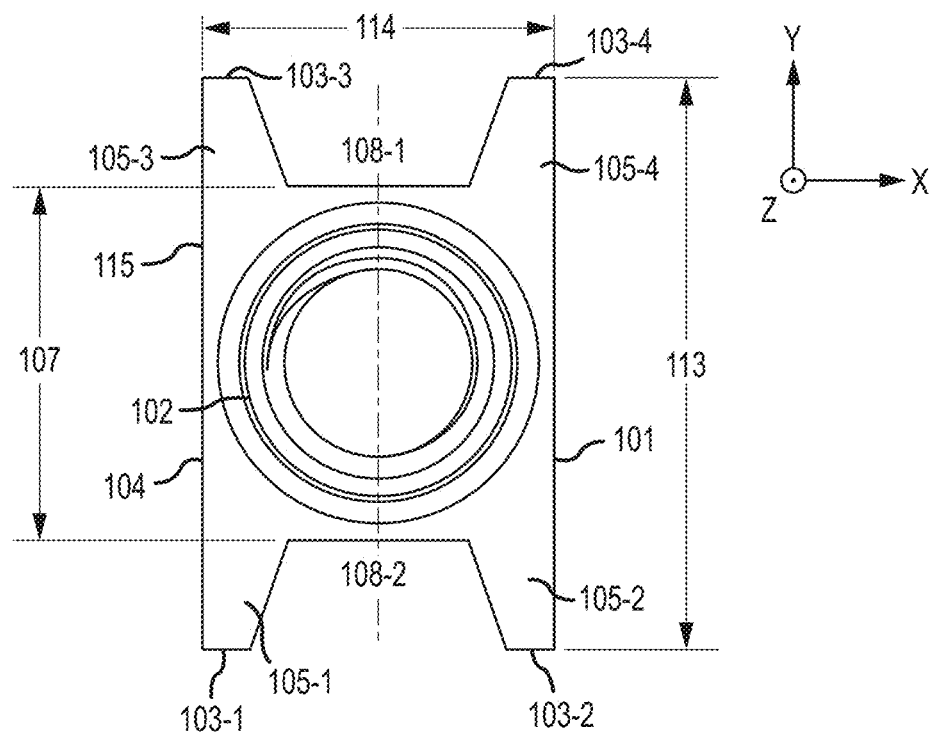
FIG. 7 illustrates a top view of an example nut of a nut clip in accordance with various embodiments.
Figure 8:
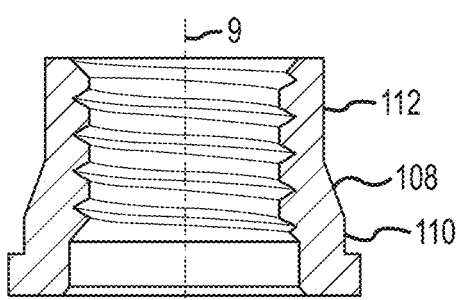
FIG. 8 illustrates a side section view of an example nut of a nut clip, in accordance with various embodiments.
Figure 9A:
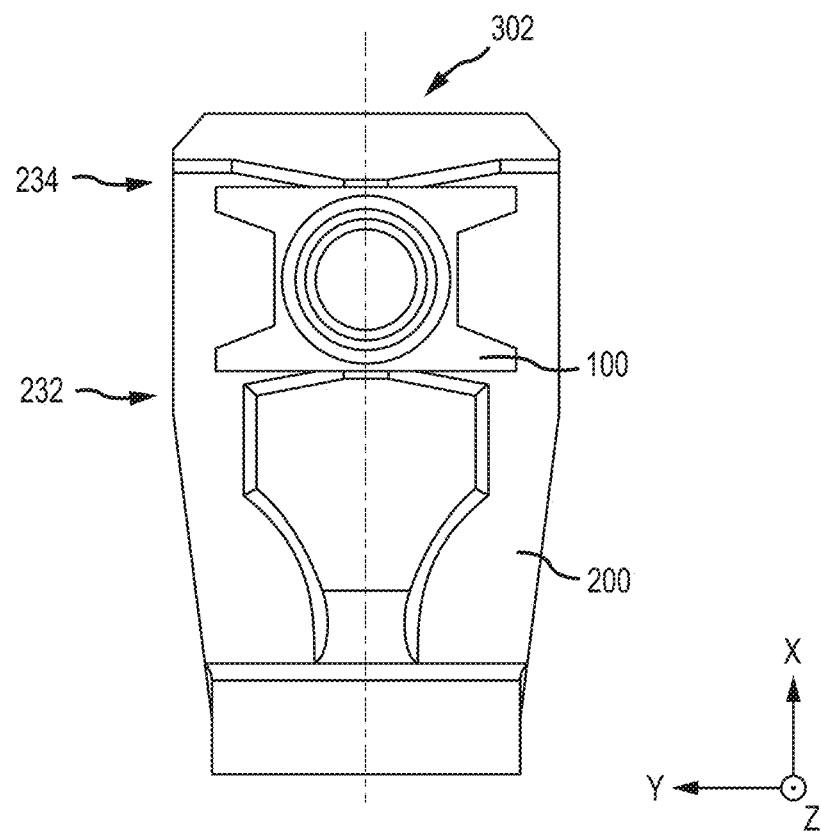
FIG. 9A illustrates a top view of an example combination of nut and clip of a nut clip in a centered relation, in accordance with various embodiments.
Figure 9B:
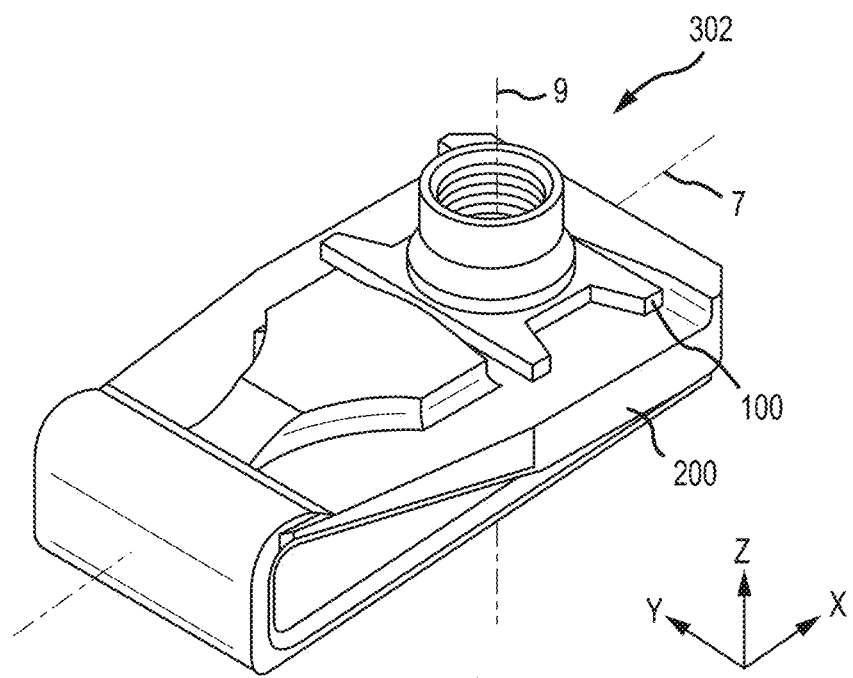
FIG. 9B illustrates a further view of an example combination of nut and clip of a nut clip in a centered relation, in accordance with various embodiments.
Figure 17A:
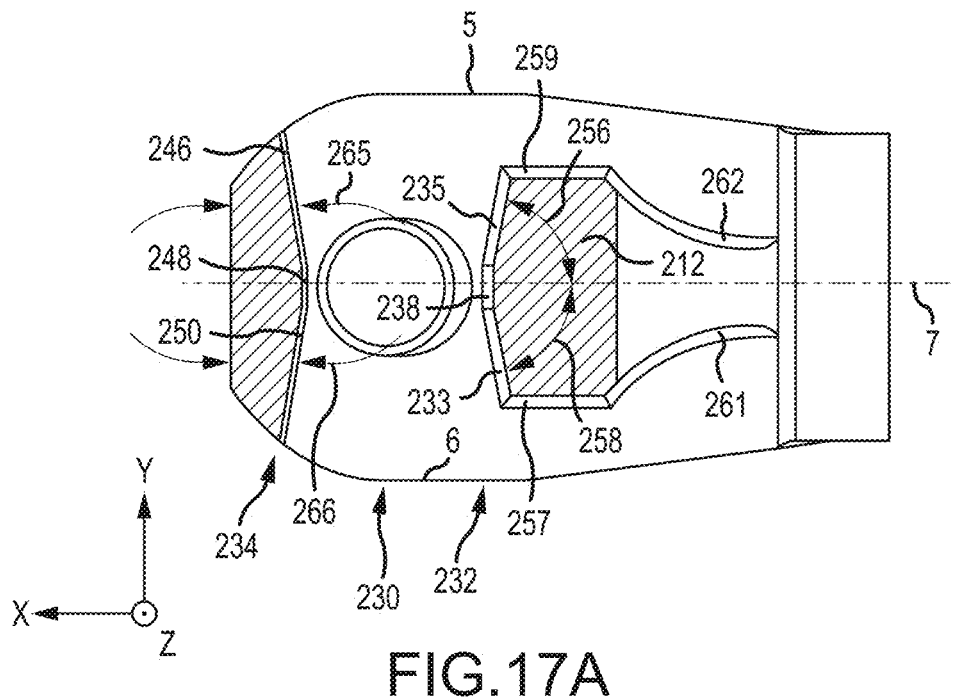
FIG. 17A illustrates a top section view of the further example clip of a nut clip, in accordance with various embodiments.
Figure 17B:
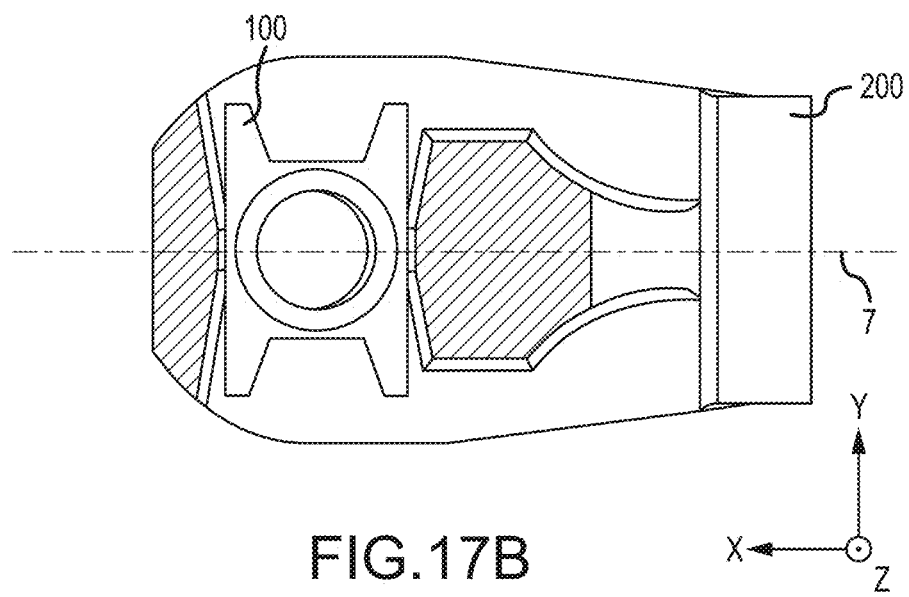
FIG. 17B illustrates a top section view of a further example combination of nut and clip of a nut clip, in accordance with various embodiments.
Figure 18A:
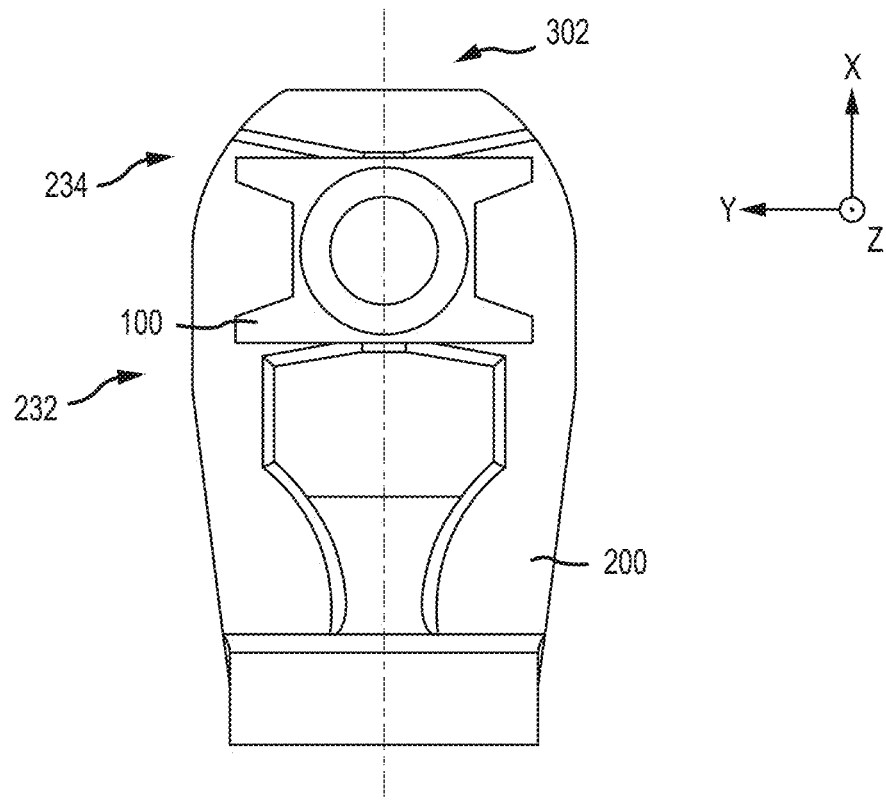
FIG. 18A illustrates a top view of the further example combination of nut and clip of a nut clip in a centered relation, in accordance with various embodiments.
Figure 18B:
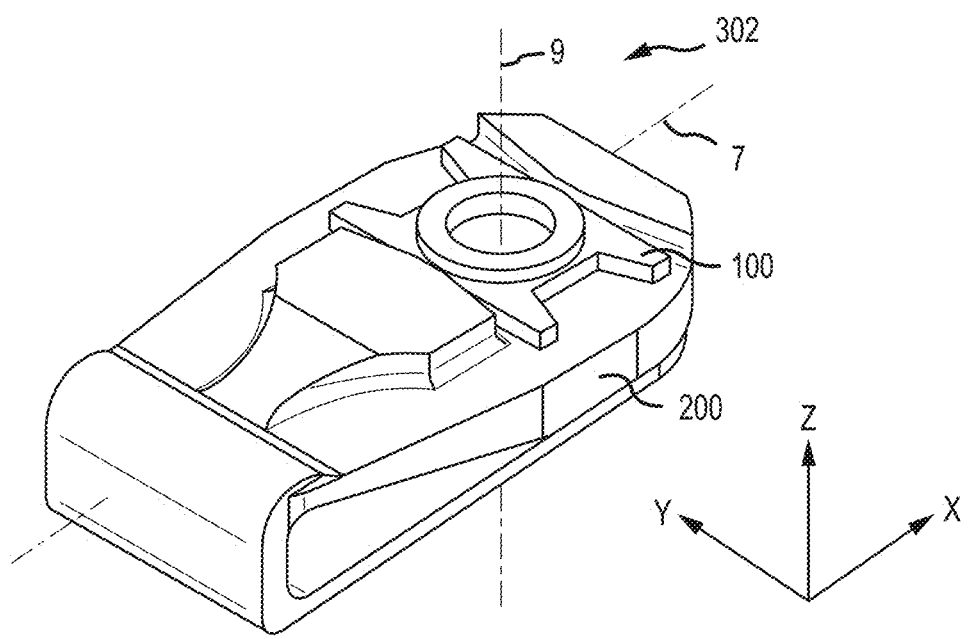
FIG. 18B illustrates a further view of the further example combination of nut and clip of a nut clip in a centered relation, in accordance with various embodiments.

With particular reference to FIGS. 5A and 17B, one or more laterally outward sides of the strengthening ramp 263 may comprise a curved plane. For instance, the strengthening ramp 263 may comprise a first reaction boss relief radius 261. A first reaction boss relief radius 261 may comprise a curved (e.g., radiused) wall of the aft reaction boss 212. The first reaction boss relief radius 261 may extend from the first reaction boss lateral side 257. The first reaction boss relief radius 261 may terminate into the main body 202 as an inclined side of the strengthening ramp 263 and may cut radially into the side of the aft reaction boss 212, narrowing the distance between the first reaction boss relief radius 261 and a corresponding second reaction boss relief radius 262 (discussed below) narrower than the distance between the first reaction boss lateral side 257 and second reaction boss lateral side 259. The first reaction boss relief radius 261 may thus arcuately narrow the strengthening ramp 263 at each point more distant from the aft reaction wall 232 along the length of the first reaction boss relief radius 261 projected onto the X-axis (e.g., central longitudinal axis 7).

In various embodiments, the first reaction boss relief radius 261 may comprise an arc length of a circle projected in the Y-X plane. In further instances, the first reaction boss relief radius 261 may comprise one or more arcs with one or more arc lengths and one or more different radius projected in the Y-X plane, such as to facilitate different lengths of strengthening ramps 263.

In various embodiments, the first reaction boss relief radius 261 terminates tangential to the central longitudinal axis 7 as the strengthening ramp 263 blends into the main body 202 proximate to the aft edge 3 and/or the nut retention flange attachment member 210. In further instances, the nut retention flange attachment member 210 comprises a localized thickening rising above (relative to a fastener insertion axis 9) the main body 202 such that the first reaction boss relief radius 261 terminates into an elevated portion of the nut retention flange attachment member 210 as the strengthening ramp 263 blends into the elevated portion of the nut retention flange attachment member 210 proximate to the aft edge 3 and/or the nut retention flange attachment member 210.

The strengthening ramp 263 also may comprise a second reaction boss relief radius 262. A second reaction boss relief radius 262 may comprise a curved (e.g., "radiused") wall of the aft reaction boss 212. The second reaction boss relief radius 262 may extend from the second reaction boss lateral side 259. The second reaction boss relief radius 262 may terminate into the main body 202 as an inclined side of the strengthening ramp 263 and may cut radially into the side of the aft reaction boss 212, narrowing the distance between the second reaction boss relief radius 262 and a corresponding first reaction boss relief radius 261 (discussed above) narrower than the distance between the first reaction boss lateral side 257 and second reaction boss lateral side 259. The second reaction boss relief radius 262 may thus arcuately narrow the strengthening ramp 263 at each point more distant from the aft reaction wall 232 along the length of the second reaction boss relief radius 262 projected onto the X-axis (e.g., central longitudinal axis 7).

In various embodiments, the second reaction boss relief radius 262 may comprise an arc length of a circle projected in the Y-X plane. In further instances, the second reaction boss relief radius 262 may comprise one or more arcs with one or more arc lengths and one or more different radius projected in the Y-X plane, such as to facilitate different lengths of strengthening ramps 263.

In various embodiments, the second reaction boss relief radius 262 terminates tangential to the central longitudinal axis 7 as the strengthening ramp 263 blends into the main body 202 proximate to the aft edge 3 and/or the nut retention flange attachment member 210. In further instances, the nut retention flange attachment member 210 comprises a localized thickening rising above (relative to a fastener insertion axis 9) the main body 202 such that the second reaction boss relief radius 262 terminates into an elevated portion of the nut retention flange attachment member 210 as the strengthening ramp 263 blends into the elevated portion of the nut retention flange attachment member 210 proximate to the aft edge 3 and/or the nut retention flange attachment member 210.

Turning attention to the forward reaction wall 234, reference to FIGS. 1, 5A, 9A-B, 10A-C, 10B, 11A-C, 13, 17A, 18A-B, 19A-C, and 20A-C, clarify specific features of this aspect of clip 200. For instance, a forward reaction wall 234, which has been explained to provide a constraint on at least one degree of freedom of movement of a nut 100, may have a specific arrangement of segments to effectuate different constraining effects on the nut 100.

Having completed the discussion of each general aspect of the clip 200, focus is now directed to the features of each such aspect, beginning with the features of the previously discussed nut retention flange 208 shown in FIGS. 1, 2, 13 and 14. With reference to FIGS. 1, 2, 5A, 10A, 11A, 13, 14, 17A, 19A, and 20A, the nut retention flange 208 comprises the first aft extending guard member 220 and the second aft extending guard member 222. The first aft extending guard member 220 and the second aft extending guard member 222 may each comprise further aspects as well. For instance, the first aft extending guard member 220 may comprise a first aft extending guard member overshoot portion 228. The first aft extending guard member overshoot portion 228 comprises a cantilevered flange portion of the nut retention flange 208 that extends past the aft reaction wall 232 of the aft reaction boss 212 and toward the aft edge 3 and/or lower flange attachment member 206 of the clip 200. For example, the first reaction boss lateral side 257 of the aft reaction boss 212 may not reach all the way to the second side 6 of the clip 200. The first aft extending guard member overshoot portion 228 may extend beyond the aft reaction wall 232 and into the space between the second side 6 and the first reaction boss lateral side 257. In further instances, the first reaction boss lateral side 257 does extend to the second side 6 of the clip 200, and the first aft extending guard member overshoot portion 228 extends over a portion of the first reaction boss lateral side 257. In either scenario, the first aft extending guard member overshoot portion 228 may be said to "overshoot" the aft reaction wall 232 along the X-axis, such as cantilevering in a negative-X axis direction or cantilevering away from the nut retention flange attachment member 210. Thus, the nut retention flange 208, and specifically the first aft extending guard member 220 may extend toward and/or beyond aspects of the aft reaction boss 212, such as beyond the aft reaction wall 232, and in this manner may further facilitate the caging of the nut 100 within the nut containment channel 230.

A first guard member distal edge 224 comprises the aft most terminal edge of the first aft extending guard member 220. The first guard member distal edge 224 is the aftmost terminus of the first aft extending guard member 220, being the negative-most point on the X-axis coinciding with an aspect of the first aft extending guard member 220. In various instances, the first guard member distal edge 224 defines a guard member overshoot distance 229 comprising a distance along central longitudinal axis 7 of the clip 200 measured between the aft reaction wall 232 and the first guard member distal edge 224. In various embodiments, the guard member overshoot distance 229 is measured from the forward-most (e.g., farthest in the positive X-axis direction) point of the aft reaction wall 232. In various embodiments, the guard member overshoot distance 229 is measured from the forward-most point of the aft reaction wall 232 as measured along the central longitudinal axis 7, which could also be defined as the point on the aft reaction wall 232 closest to the forward reaction wall 234 and/or closest to the forward edge 4, or otherwise having a point on the boundary of the nut containment channel 230 that is farthest from the lower flange attachment member 206.

In a similar way, the second aft extending guard member 222 may comprise a second aft extending guard member overshoot portion 231. The second aft extending guard member overshoot portion 231 comprises a cantilevered flange portion of the nut retention flange 208 that extends past the aft reaction wall 232 of the aft reaction boss 212 and toward the aft edge 3 and/or lower flange attachment member 206 of the clip 200. For example, the second reaction boss lateral side 259 of the aft reaction boss 212 may not reach all the way to the first side 5 of the clip 200. The second aft extending guard member overshoot portion 231 may extend beyond the aft reaction wall 232 and into the space between the first side 5 and the second reaction boss lateral side 259. In further instances, the second reaction boss lateral side 259 does extend to the first side 5 of the clip 200, and the second aft extending guard member overshoot portion 231 extends over a portion of the second reaction boss lateral side 259. In either scenario, the second aft extending guard member overshoot portion 231 may be said to "overshoot" the aft reaction wall 232 along the X-axis, such as cantilevering in a negative-X axis direction or cantilevering away from the nut retention flange attachment member 210. Thus, the nut retention flange 208, and specifically the second aft extending guard member 222 may extend toward and/or beyond aspects of the aft reaction boss 212, such as beyond the aft reaction wall 232, and in this manner may further facilitate the caging of the nut 100 within the nut containment channel 230.

A second guard member distal edge 225 comprises the aft most terminal edge of the second aft extending guard member 222. The second guard member distal edge 225 is the aftmost terminus of the second aft extending guard member 222, being the negative-most point on the X-axis coinciding with an aspect of the second aft extending guard member 222. In various instances, the second guard member distal edge 225 defines a guard member overshoot distance 229 comprising a distance along central longitudinal axis 7 of the clip 200 measured between the aft reaction wall 232 and the second guard member distal edge 225. In various embodiments, the guard member overshoot distance 229 is measured from the forward-most (e.g., farthest in the positive X-axis direction) point of the aft reaction wall 232. In various embodiments, the guard member overshoot distance 229 is measured from the forward-most point of the aft reaction wall 232 as measured along the central longitudinal axis 7, which could also be defined as the point on the aft reaction wall 232 closest to the forward reaction wall 234 and/or closest to the forward edge 4, or otherwise having a point on the boundary of the nut containment channel 230 that is farthest from the lower flange attachment member 206.

Many aspects of a clip 200 and nut 100 of a nut clip 2 have now been discussed. The following discussion will relate to aspects of both the aft reaction boss 212 (FIGS. 1, 3, 5A, 13, 15, and 17A) and to the forward reaction wall 234 (FIGS. 5A, 9A, 10A-C, 11A-C, 17A, 18A, 19A-C, and 20A-C) and their respective roles in reacting forces from a nut 100, such as during tightening. One aspect of a nut clip 2 is the facilitation of blind tightening of fasteners. In other words, a bolt may be tightened into a nut 100 without use of a wrench, socket, or other tool to hold the nut 100 in substantially fixed position during the tightening. Rather than utilizing a tool to react the tightening force applied during twisting of a tightening bolt, the clip 200 includes features whereby the forces are reacted. Similarly, rather than utilizing a tool to react the loosening force applied during twisting of a loosening bolt, the clip 200 includes features whereby the forces are reacted.

With reference to FIGS. 1, 5A, 9A-B, 10A-C, 11A-C, 13, 17B, 18A-B, 19A-C, and 20A-C, clip 200 may have an aft reaction boss 212 which may have an aft reaction wall 232 that at least partially reacts these forces, and the clip 200 may also have a forward reaction wall 234 which also at least partially reacts these forces. In various instances, features of the aft reaction wall 232 and features of the forward reaction wall 234 are selected with consideration for one another. For instance, a first part of an aft reaction wall 232 may engage a first part of a nut 100 during tightening and a first part of a forward reaction wall 234 may a second part of a nut 100 during tightening. In this manner the first part of the aft reaction wall 232 and the first part of the forward reaction wall 234 may work in concert.

Similarly, a second part of an aft reaction wall 232 may engage a third part of a nut 100 during loosening, and a second part of a forward reaction wall 234 may engage a fourth part of a nut 100 during loosening. The first, second, third, and fourth part of the nut 100 may comprise tabs extending from the nut 100, or may simply comprise portions of sides of the nut 100. These parts may also be shaped to conform to the shape of the various relevant sections of the aft reaction wall 232 and forward reaction wall 234, facilitating the distribution of tightening forces and loosening forces over a surface area, limiting the concentration of forces at small areas and/or points, and thereby improving the resiliency and durability of the nut clip 2, as well as ameliorating unwanted distortion, bending, and the like.

The aft reaction wall 232 may include corresponding features reflected about an axis. Also the forward reaction wall 234 may include corresponding features reflected about an axis. This symmetry may facilitate conformance of the relevant sections of the aft reaction wall 232 and forward reaction wall 234 to corresponding aspects of the nut 100 during both the application of a clockwise rotational force as well as during the application of a counterclockwise rotational force, such as may exist during tightening and loosening operations. Furthermore, this symmetry may facilitate diminishment of fatigue and stress wear due to the facilitation of contact of the nut 100 to the clip 200 along planar surfaces, rather than points or edges, thereby facilitating the distribution of forces arising from wear and vibration and ameliorating a tendency toward localized failure due to force concentration and/or erosion.

The aft reaction wall 232 and the forward reaction wall 234 may include corresponding features that, when the aft reaction wall 232 is reflected about an axis, coincide with features of the forward reaction wall 234 and similarly, that when the forward reaction wall 234 is reflected about an axis, coincide with features of the aft reaction wall 232. This symmetry may provide similar functionality as the symmetry of different parts of the aft reaction wall 232 with respect to each other as reflected about a different axis and/or different parts of the forward reaction wall 234 with respect to each other as reflected about the different axis. This may facilitate proper operation without necessitating precise reference/registration of the nut 100 to the clip 200. Thus, this may facilitate manufacturability, such as allowing the nut 100 to be inserted in a variety of different orientations respective to the clip 200, and still operate properly.

The aft reaction wall 232 may comprise a first aft reaction wall angled segment 233. A first aft reaction wall angled segment 233 may comprise a face of the aft reaction wall 232. First aft reaction wall angled segment 233 may comprise a plane rising from the main body 202 normal to the main body 202. The first aft reaction wall angled segment 233 may extend from the second reaction boss lateral side 259 toward, but not all the way to the first reaction boss lateral side 257. The first aft reaction wall angled segment 233 may thus be said to extend laterally across at least a portion of the length of the aft reaction wall 232. The first aft reaction wall angled segment 233 may however be angled relative to a perpendicular line of the central longitudinal axis 7. Thus, the first aft reaction wall angled segment 233 may at each point farther along the length of its face, such as toward the central longitudinal axis 7, be disposed nearer to the forward reaction wall 234. In other words, the opposing distal ends of the first aft reaction wall angled segment 233 may coincide with different points along the central longitudinal axis 7 when projected on to the central longitudinal axis 7. In various embodiments, an angle is defined between the central longitudinal axis 7 and the first aft reaction wall angled segment 233 comprising a first aft reaction wall angled segment angle 256. The first aft reaction wall angled segment angle 256 may comprise a non-orthogonal angle. In further instances, the first aft reaction wall angled segment angle 256 may however comprise a substantially orthogonal angle. In various embodiments, the first aft reaction wall angled segment angle 256 comprises an 80-degree angle. In various embodiments, the first aft reaction wall angled segment angle 256 may comprise an 80-degree angle (+/−5 degrees). In further embodiments, the first aft reaction wall angled segment angle 256 may comprise an 80-degree angle (+/−1 degree). Thus, one may appreciate that in addition to symmetrically corresponding to a reflection of aspects of the aft reaction wall 232, and/or to aspects of the forward reaction wall 234, in addition, the aft reaction wall 232 may facilitate centering of the nut 100 relative to a transverse fastener passage 214 (FIGS. 2 and 14), such as to facilitate alignment of the nut 100 for easy insertion of a bolt, by the use of angled faces to impel the nut 100 to center. Moreover, the first aft reaction wall angled segment angle 256 may further facilitate partial rotation of the nut 100 during tightening and/or loosening operation, providing some accommodation for tolerance stack up and ease of starting the bolt into the nut 100, and yet foreclosing free spinning of the nut 100, so that a tool is not required to hold the nut 100 and react tightening or loosening forces. Yet furthermore, the first aft reaction wall angled segment angle 256 facilitates face-to-face contact of planar surfaces of the nut 100 such as a second tab 105-2 (FIGS. 6, 7, 10A, 11A, 19A, and 20A) of a force reaction portion 104 (FIG. 6) of a nut 100 (FIGS. 1, 4B, 5B, 6, 13, 16B, and 17B), to the first aft reaction wall angled segment 233 and ameliorates point contacts, thereby facilitating the amelioration of force concentration and associated, wear, distortion, and failure during use.

The aft reaction wall 232 also may comprise a second aft reaction wall angled segment 235. A second aft reaction wall angled segment 235 may comprise a face of the aft reaction wall 232. Second aft reaction wall angled segment 235 may comprise a plane rising from the main body 202 normal to the main body 202. The second aft reaction wall angled segment 235 may extend from the first reaction boss lateral side 257 toward, but not all the way to the second reaction boss lateral side 259. The second aft reaction wall angled segment 235 may thus be said to extend laterally across at least a portion of the length of the aft reaction wall 232. The second aft reaction wall angled segment 235 may however be angled relative to a perpendicular line of the central longitudinal axis 7. Thus, the second aft reaction wall angled segment 235 may at each point farther along the length of its face, such as toward the central longitudinal axis 7, be disposed nearer to the forward reaction wall 234. In other words, the opposing distal ends of the second aft reaction wall angled segment 235 may coincide with different points along the central longitudinal axis 7 when projected on to the central longitudinal axis 7. In various embodiments, an angle is defined between the central longitudinal axis 7 and the second aft reaction wall angled segment 235 comprising a second aft reaction wall angled segment angle 258. The second aft reaction wall angled segment angle 258 may comprise a non-orthogonal angle. In further instances, the second aft reaction wall angled segment angle 258 may however comprise a substantially orthogonal angle. In various embodiments, the second aft reaction wall angled segment angle 258 comprises an 80-degree angle. In various embodiments, the second aft reaction wall angled segment angle 258 may comprise an 80-degree angle (+/−5 degrees). In further embodiments, the second aft reaction wall angled segment angle 258 may comprise an 80-degree angle (+/−1 degree). Thus, one may appreciate that in addition to symmetrically corresponding to a reflection of aspects of the aft reaction wall 232, and/or to aspects of the forward reaction wall 234, in addition, the aft reaction wall 232 may facilitate centering of the nut 100 relative to a transverse fastener passage 214 (FIGS. 2, 14), such as to facilitate alignment of the nut 100 for easy insertion of a bolt, by the use of angled faces to impel the nut 100 to center. Moreover, the second aft reaction wall angled segment angle 258 may further facilitate partial rotation of the nut 100 during tightening and/or loosening operation, providing some accommodation for tolerance stack up and ease of starting the bolt into the nut 100, and yet foreclosing free spinning of the nut 100, so that a tool is not required to hold the nut 100 and react tightening or loosening forces. Yet furthermore, the second aft reaction wall angled segment angle 258 facilitates face-to-face contact of planar surfaces of the nut 100 such as a fourth tab 105-4 (FIGS. 6, 7, 10A, 11A, 19A, and 20A) of a force reaction portion 104 (FIG. 6) of a nut 100 (FIGS. 1, 4B, 5B, 6, 13, 16B, and 17B), to the second aft reaction wall angled segment 235 and ameliorates point contacts, thereby facilitating the amelioration of force concentration and associated, wear, distortion.

The aft reaction wall 232 may also comprise an interstitial aft reaction wall transverse segment 238. The interstitial aft reaction wall transverse segment 238 may comprise a face of the aft reaction wall 232. The interstitial aft reaction wall transverse segment 238 may comprise a plane rising from the main body 202 normal to the main body 202. The interstitial aft reaction wall transverse segment 238 may extend between an inward distal end of the first aft reaction wall angled segment 233 and an inward distal end of the second aft reaction wall angled segment 235. Thus the interstitial aft reaction wall transverse segment 238 is disposed interstitially between the first aft reaction wall angled segment 233 and the second aft reaction wall angled segment 235. The interstitial aft reaction wall transverse segment 238 joins the first aft reaction wall angled segment 233 and the second aft reaction wall angled segment 235. Thus, in various embodiments, the first aft reaction wall angled segment 233 and one-half of the interstitial aft reaction wall transverse segment 238 may be reflected about the central longitudinal axis 7 and coincide exactly with the second aft reaction wall angled segment 235 and a second one-half of the interstitial aft reaction wall transverse segment 238. In various instances, the interstitial aft reaction wall transverse segment 238 comprises a planar face orthogonal to the central longitudinal axis 7. Thus the first aft reaction wall angled segment 233 may be at an angle relative to the interstitial aft reaction wall transverse segment 238. Similarly, the second aft reaction wall angled segment 235 may be at an angle relative to the interstitial aft reaction wall transverse segment 238. The interstitial aft reaction wall transverse segment 238 may lie in a plane called the interstitial aft reaction wall transverse segment plane 227. The interstitial aft reaction wall transverse segment plane 227 may extend laterally across the clip 200 orthogonal to the central longitudinal axis 7. In various embodiments, the guard member overshoot distance 229 (FIGS. 2 and 14) is measured in a direction parallel to the central longitudinal axis 7 and is measured from the interstitial aft reaction wall transverse segment plane 227.

The discussion of the aft reaction wall 232 is now complete and attention is directed to FIGS. 1, 4A, 5A, 9A-B, 10A-C, 11A-C, 13, 16A, 17A, 18A-B, 19A-C, and 20A-C for a discussion of the forward reaction wall 234. FIGS. 1, 4A, 5A, 9A-B, 10A-C, 11A-C depict a first example embodiment of a forward reaction wall 234 and FIGS. 13, 16A, 17A, 18A-B, 19A-C, and 20A-C depict a second example embodiment of a forward reaction wall 234. While the meaning of the following terms will become clear through the following discussion, a brief summary of certain differences between these embodiments is useful. In brief, the forward reaction wall 234 of FIGS. 13, 16A, 17A, 18A-B, 19A-C, and 20A-C omits items 240, 242, 252, and 254 that are illustrated in FIGS. 1, 4A, 5A, 9A-B, 10A-C, and 11A-C.

The forward reaction wall 234 may comprise a first forward reaction wall angled segment 246. A first forward reaction wall angled segment 246 may comprise a face of the forward reaction wall 234. First forward reaction wall angled segment 246 may comprise a plane rising from the main body 202 normal to the main body 202. The first forward reaction wall angled segment 246 may extend from a first forward reaction wall distal point of inflection 242 toward, but not all the way to a laterally opposite edge of the clip 200 (e.g., having a direction decomposable into at least one vector orthogonal to the central longitudinal axis 7). Alternatively, the first forward reaction wall angled segment 246 may extend from a perimeter edge of the nut clip toward, but not all the way to a laterally opposite edge of the clip 200 (e.g., having a direction decomposable into at least one vector orthogonal to the central longitudinal axis 7). Thus, the first forward reaction wall angled segment 246 may have a variety of lengths, as desired. The first forward reaction wall angled segment 246 may thus be said to extend laterally across at least a portion of the length of the forward reaction wall 234. The first forward reaction wall angled segment 246 may however be angled relative to a perpendicular line of the central longitudinal axis 7. Thus, the first forward reaction wall angled segment 246 may at each point farther along the length of its face, such as toward the central longitudinal axis 7, be disposed nearer to the aft reaction wall 232. In other words, the opposing distal ends of the first forward reaction wall angled segment 246 may coincide with different points along the central longitudinal axis 7 when projected on to the central longitudinal axis 7. In various embodiments, an angle is defined between the central longitudinal axis 7 and the first forward reaction wall angled segment 246 comprising a first forward reaction wall angled segment angle 265. The first forward reaction wall angled segment angle 265 may comprise a non-orthogonal angle. In further instances, the first forward reaction wall angled segment angle 265 may however comprise a substantially orthogonal angle. In various embodiments, the first forward reaction wall angled segment angle 265 comprises a 10-degree angle. In various embodiments, the first forward reaction wall angled segment angle 265 may comprise a 10-degree angle (+/−5 degrees). In further embodiments, the first forward reaction wall angled segment angle 265 may comprise a 10-degree angle (+/−1 degree). Thus, one may appreciate that in addition to symmetrically corresponding to a reflection of aspects of the forward reaction wall 234, and/or to aspects of the forward reaction wall 234, in addition, the forward reaction wall 234 may facilitate centering of the nut 100 relative to a transverse fastener passage 214 (FIG. 2), such as to facilitate alignment of the nut 100 for easy insertion of a bolt, by the use of angled face(s) to impel the nut 100 to center. Moreover, the first forward reaction wall angled segment angle 265 may further facilitate partial rotation of the nut 100 during tightening and/or loosening operation, providing some accommodation for tolerance stack up and ease of starting the bolt into the nut 100, and yet foreclosing free spinning of the nut 100, so that a tool is not required to hold the nut 100 and react tightening or loosening forces. Yet furthermore, the first forward reaction wall angled segment angle 265 facilitates face-to-face contact of planar surfaces of the nut 100 such as a third tab 105-3 (FIGS. 6, 7, 10A-C, 11A-C, 19A-C, and 20A-C) of a force reaction portion 104 (FIG. 6) of a nut 100 (FIGS. 1, 4B, 5B, 6, 13, 16B, and 17B), to the first forward reaction wall angled segment 246 and ameliorates point contacts, thereby facilitating the amelioration of force concentration and associated, wear, distortion.

The forward reaction wall 234 may comprise a second forward reaction wall angled segment 250. A second forward reaction wall angled segment 250 may comprise a face of the forward reaction wall 234. Second forward reaction wall angled segment 250 may comprise a plane rising from the main body 202 normal to the main body 202. The second forward reaction wall angled segment 250 may extend from a second forward reaction wall distal point of inflection 252 toward, but not all the way to a laterally opposite edge of the clip 200 (e.g., having a direction decomposable into at least one vector orthogonal to the central longitudinal axis 7). Alternatively, the first forward reaction wall angled segment 246 may extend from a perimeter edge of the nut clip toward, but not all the way to a laterally opposite edge of the clip 200 (e.g., having a direction decomposable into at least one vector orthogonal to the central longitudinal axis 7). Thus, the first forward reaction wall angled segment 246 may have a variety of lengths, as desired. The second forward reaction wall angled segment 250 may thus be said to extend laterally across at least a portion of the length of the forward reaction wall 234. The second forward reaction wall angled segment 250 may however be angled relative to a perpendicular line of the central longitudinal axis 7. Thus, the second forward reaction wall angled segment 250 may at each point farther along the length of its face, such as toward the central longitudinal axis 7, be disposed nearer to the aft reaction wall 232. In other words, the opposing distal ends of the second forward reaction wall angled segment 250 may coincide with different points along the central longitudinal axis 7 when projected on to the central longitudinal axis 7. In various embodiments, an angle is defined between the central longitudinal axis 7 and the second forward reaction wall angled segment 250 comprising a second forward reaction wall angled segment angle 266. The second forward reaction wall angled segment angle 266 may comprise a non-orthogonal angle. In further instances, the second forward reaction wall angled segment angle 266 may however comprise a substantially orthogonal angle. In various embodiments, the second forward reaction wall angled segment angle 266 comprises a 10-degree angle. In various embodiments, the second forward reaction wall angled segment angle 266 may comprise a 10-degree angle (+/−5 degrees). In further embodiments, the second forward reaction wall angled segment angle 266 may comprise a 10-degree angle (+/−1 degree). Thus, one may appreciate that in addition to symmetrically corresponding to a reflection of aspects of the forward reaction wall 234, and/or to aspects of the forward reaction wall 234, in addition, the forward reaction wall 234 may facilitate centering of the nut 100 relative to a transverse fastener passage 214 (FIGS. 2 and 14), such as to facilitate alignment of the nut 100 for easy insertion of a bolt, by the use of angled faces to impel the nut 100 to center. Moreover, the second forward reaction wall angled segment angle 266 may further facilitate partial rotation of the nut 100 during tightening and/or loosening operation, providing some accommodation for tolerance stack up and ease of starting the bolt into the nut 100, and yet foreclosing free spinning of the nut 100, so that a tool is not required to hold the nut 100 and react tightening or loosening forces. Yet furthermore, the second forward reaction wall angled segment angle 266 facilitates face-to-face contact of planar surfaces of the nut 100 such as a third tab 105-1 (FIGS. 6, 7, 10A, 11A, 19A, and 20A) of a force reaction portion 104 (FIG. 6) of a nut 100 (FIGS. 1, 4B, 5B, 6, 16B, and 17B), to the second forward reaction wall angled segment 250 and ameliorates point contacts, thereby facilitating the amelioration of force concentration and associated, wear, distortion.

The forward reaction wall 234 may also comprise an interstitial forward reaction wall transverse segment 248. The interstitial forward reaction wall transverse segment 248 may comprise a face of the forward reaction wall 234. The interstitial forward reaction wall transverse segment 248 may comprise a plane rising from the main body 202 normal to the main body 202. The interstitial forward reaction wall transverse segment 248 may extend between an inward distal end of the first forward reaction wall angled segment 246 and the second forward reaction wall angled segment 250. Thus the interstitial forward reaction wall transverse segment 248 is disposed interstitially between the first forward reaction wall angled segment 246 and the second forward reaction wall angled segment 250. The interstitial forward reaction wall transverse segment 248 joins the first forward reaction wall angled segment 246 and the second forward reaction wall angled segment 250. Thus, in various embodiments, the first forward reaction wall angled segment 246 and one-half of the interstitial forward reaction wall transverse segment 248 may be reflected about the central longitudinal axis 7 and coincide exactly with the second forward reaction wall angled segment 250 and a second one-half of the interstitial forward reaction wall transverse segment 248. In various instances the interstitial forward reaction wall transverse segment 248 comprises a planar face orthogonal to the central longitudinal axis 7. Thus the first forward reaction wall angled segment 246 may be at an angle relative to the interstitial forward reaction wall transverse segment 248. Similarly, the second forward reaction wall angled segment 250 may be at an angle relative to the interstitial forward reaction wall transverse segment 248.

The forward reaction wall 234 may include further segments. FIGS. 1, 4A, 5A, 9A-B, 10A-C, 11A-C depict a first example embodiment of a forward reaction wall 234 with further segments and FIGS. 13, 16A, 17A, 18A-B, 19A-C, and 20A-C depict a second example embodiment of a forward reaction wall 234 without further segments. While the first forward reaction wall angled segment 246 may be parallel to the first aft reaction wall angled segment 233 and while the second forward reaction wall angled segment 250 may be parallel to the second aft reaction wall angled segment 235, it is notable that in various embodiments the aft reaction walls are associated with an aft reaction boss 212, which in various embodiments does not reach from first side 5 to second side 6. However, because the forward reaction wall 234 is associated with a face of the nut retention flange attachment member 210 (FIG. 1), in various embodiments, the forward reaction wall 234 reaches from the first side 5 to the second side 6. Consequently, the first distal point of inflection 242 and the second distal point of inflection 252 may be inset from the first side 5 and the second side 6 relative to a lateral direction comprising a perpendicular axis of the central longitudinal axis 7 (FIGS. 1, 4A, 5A, 9A-B, 10A-C, and 11A-C) and in further instances (FIGS. 13, 16A, 17A, 18A-B, 19A-C, 20A-C), may be omitted and the first forward reaction wall angled segment 246 may extend all the way to the first side 5 and the second forward reaction wall angled segment 250 may extend all the way to the second side 6. More specifically, with reference to FIGS. 1, 4A, 5A, 9A-B, 10A-C, and 11A-C the forward reaction wall 234 may further comprise a first distal forward reaction wall guard segment 240 and a second distal forward reaction wall guard segment 254, which may adjoin the first forward reaction wall angled segment 246 and the second forward reaction wall angled segment 250 at the first distal point of inflection 242 and the second distal point of inflection 252, respectively. In further instances, the first distal forward reaction wall guard segment 240 and the second distal forward reaction wall guard segment 254 are omitted (see FIGS. 13, 16A, 17A, 18A-B, 19A-C, 20A-C).

In various embodiments, first distal forward reaction wall guard segment 240 may extend from a second side 6 of the clip 200 to the first distal point of inflection 242. By choosing a length of the first distal forward reaction wall guard segment 240, the position of the first distal point of inflection 242, both in the lateral (Y-axis) direction perpendicular to the central longitudinal axis 7, as well as in the longitudinal (X-axis) direction parallel to the central longitudinal axis 7, may be chosen. In various embodiments, the first distal forward reaction wall guard segment 240 has a length chosen with respect to the dimensions of the nut 100 in order to ameliorate unwanted wear arising from an edge of the nut 100, such as the distal tip of the portion of the nut 100 that contacts the forward reaction wall 234. Thus the distal tip of the portion of the nut 100 that contacts the forward reaction wall 234 may, in various embodiments, coincide with the first distal point of inflection 242 when the nut 100 is in contact with the first distal forward reaction wall guard segment 240. In various embodiments, the first distal forward reaction wall guard segment 240 comprises a plane orthogonal to the central longitudinal axis 7. For instance, in various embodiments, the first distal forward reaction wall guard segment 240 extends laterally across at least a portion of the clip 200. In yet further embodiments, the first distal forward reaction wall guard segment 240 may extend from the first forward reaction wall angled segment distal point of inflection 242 toward the edge of the clip 200, such as the second side 6, but not react all the way to the edge of the clip 200, such as the second side 6.

In various embodiments, second distal forward reaction wall guard segment 254 may extend from a first side 5 of the clip 200 to the second distal point of inflection 252. By choosing a length of the second distal forward reaction wall guard segment 254, the position of the second distal point of inflection 252, both in the lateral (Y-axis) direction perpendicular to the central longitudinal axis 7, as well as in the longitudinal (X-axis) direction parallel to the central longitudinal axis 7, may be chosen. In various embodiments, the second distal forward reaction wall guard segment 254 has a length chosen with respect to the dimensions of the nut 100 in order to ameliorate unwanted wear arising from an edge of the nut 100, such as the distal tip of the portion of the nut 100 that contacts the forward reaction wall 234. Thus the distal tip of the portion of the nut 100 that contacts the forward reaction wall 234 may, in various embodiments, coincide with the second distal point of inflection 252 when the nut 100 is in contact with the second distal forward reaction wall guard segment 254. In various embodiments, the second distal forward reaction wall guard segment 254 comprises a plane orthogonal to the central longitudinal axis 7. For instance, in various embodiments, the second distal forward reaction wall guard segment 254 extends laterally across at least a portion of the clip 200. In yet further embodiments, the first distal forward reaction wall guard segment 240 may extend from the second distal forward reaction wall angled segment distal point of inflection 252 toward the edge of the clip 200, such as the first side 5, but not react all the way to the edge of the clip 200, such as the first side 5.

Returning focus to FIG. 1, and having introduced many aspects of the clip 200, reference is now made to the nut 100. Further focus is directed to FIGS. 4B, 5B, 6, 7, 8, 10A-C, 11A-C, 16B, 17B, 19A-C, and 20A-C for a detailed discussion of the features of the nut 100.

A nut 100 comprises a body configured to receive a fastener and loadable in compression against the clip 200 by tightening of the received fastener. For instance, a first article may be inserted into the fastening channel 207 (FIGS. 1, 4A, 13, and 16A) and a second article may be proximate to the lower flange 204 (FIGS. 1, 4A, 13 and 16A) of the clip 200. A fastener may be inserted through the transverse fastener passage 214 (FIGS. 2 and 14) and received into the nut 100. The fastener may be tightened, such as by the twistable union of corresponding threads of the fastener and the nut 100. In this manner, the nut 100 loads the clip 200 in compression. Moreover, because the nut 100 is caged in the nut containment channel 230 (FIGS. 1, 4A, 5A, 13, 16A, and 17A), the tightening of the fastener-nut combination may proceed without use of a tool to hold the nut 100 in position to react the tightening (or loosening) force.

A nut 100 generally includes a fastener receiving portion 102 configured to receive a fastener in mechanical communication, and a force reaction portion 104 configured to mechanically contact the clip 200 to react the force of tightening and loosening the fastener. In various embodiments, the nut 100 further comprises a reinforcement portion 106 configured to strengthen a union of the fastener receiving portion 102 and the force reaction portion 104.

Figure 2:
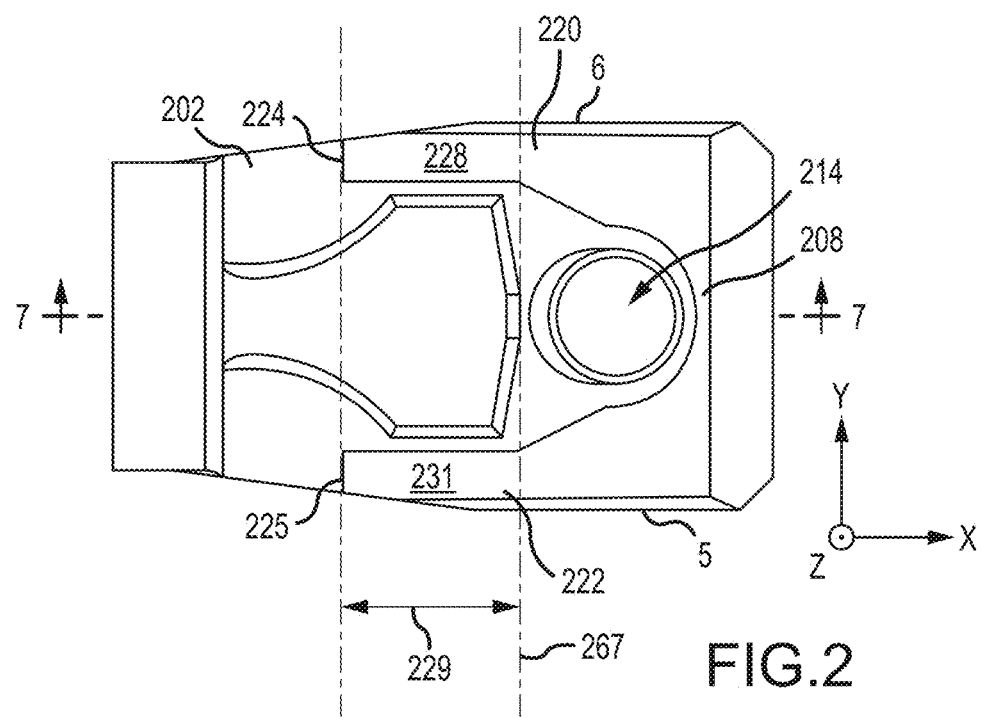
FIG. 2 illustrates a top view of an example clip of a nut clip, in accordance to various embodiments.
Figure 3:
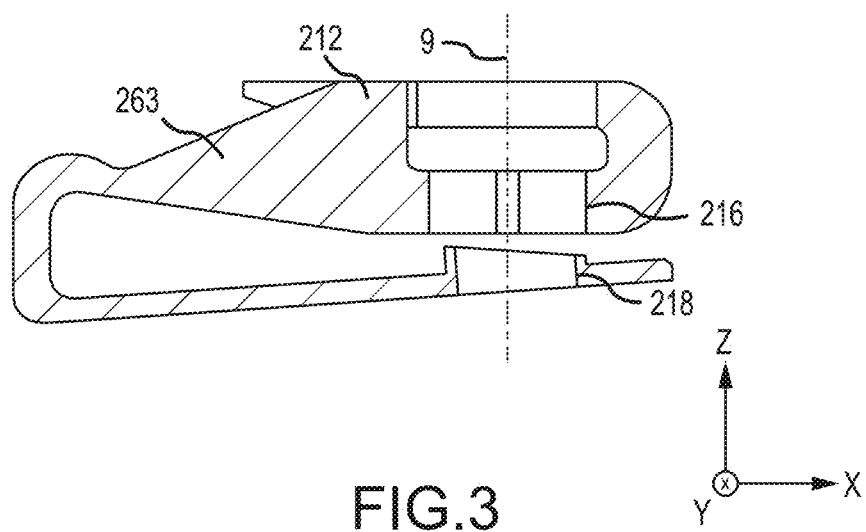
FIG. 3 illustrates a side section view of an example clip of a nut clip, in accordance with various embodiments.
Figure 14:
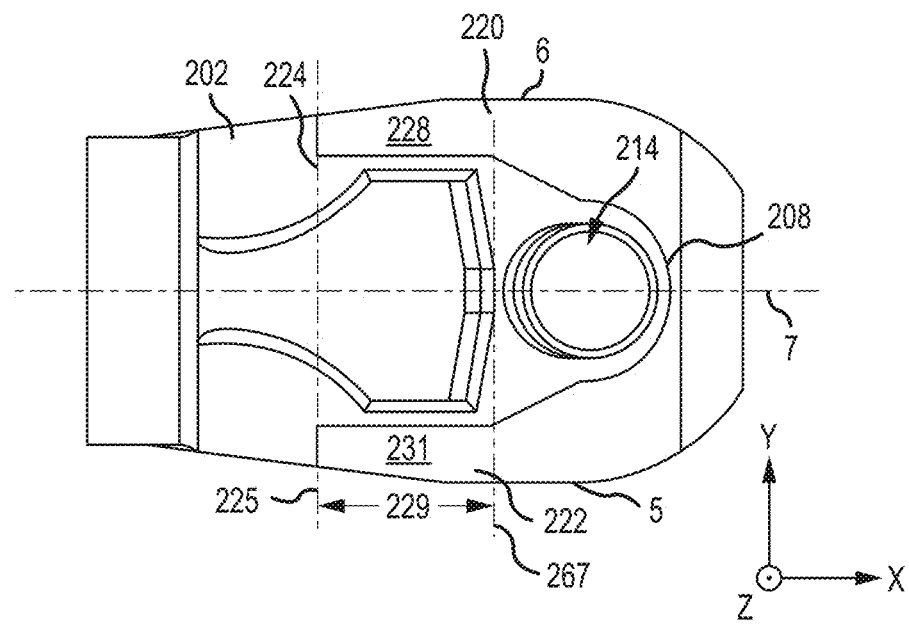
FIG. 14 illustrates a top view of the further example clip of a nut clip, in accordance to various embodiments.
Figure 15:
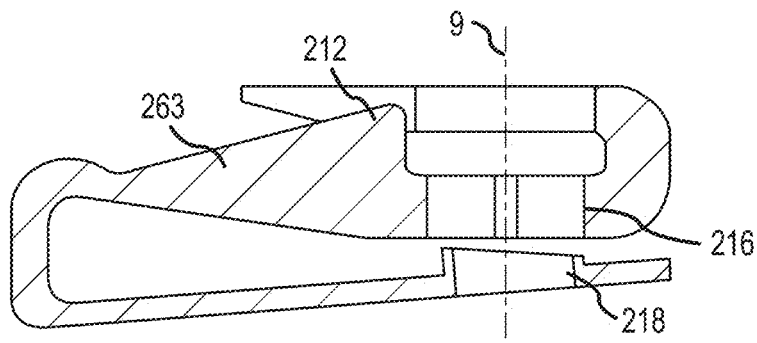
FIG. 15 illustrates a side section view of the further example clip of a nut clip, in accordance with various embodiments.

The fastener receiving portion 102 may comprise a threaded channel configured to receive a fastener. For example, the fastener receiving portion 102 may comprise a fastener tube 112. The fastener tube 112 may have a fastener insertion axis 9 corresponding to a cylindrical aperture defined through the fastener tube 112. In various embodiments, the fastener insertion axis 9 comprises an axis normal to the surface of the main body 202 or decomposable into vectors, one of which is normal to the surface of the main body 202, and aligned with the transverse fastener passage 214 (FIGS. 2 and 14). Thus, the fastener receiving portion 102 may receive a threaded bolt.

The reinforcement portion 106 may comprise a localized thickening of the fastener receiving portion 102 proximate to a union of the fastener receiving portion 102 to the force reaction portion 104. In various embodiments, the fastener receiving portion 102 comprises a thickening of the fastener tube 112. The thickening may comprise a profile corresponding to a trapezoid revolved about the fastener tube 112. In further embodiments, the thickening may comprise a profile corresponding to a triangle revolved about the fastener tube 112, or an arcuate ramp, or any other shape as desired. In various embodiments, the reinforcement portion 106 further comprises arcs and/or chamfers such as to ameliorate stress concentrations.

Finally, the force reaction portion 104 of the nut 100 comprises various aspects. With particular focus on FIGS. 6, 7, and 8, the force reaction portion 104 may comprise a plate member. This plate member may have several sides. For example, the force reaction portion 104 may have first longer side 101 and a second longer side 115.

The first longer side 101 may comprise an edge of a plate, the first longer side 101 extending in an X-axis direction and lying in a Y-X plane (relative to the fastener insertion axis 9 and the fastener receiving portion 102 which may extend in a Z-axis direction normal to the Y-X plane). The first longer side 101 may be configured to alternately contact aspects of the forward reaction wall 234 (FIGS. 1, 5A, 9A-B, 10A-C, 11A-C, 13, 17A, 18A-B, 19A-C, and 20A-C) such as a first forward reaction wall angled segment 246 and a second forward reaction wall angled segment 250. In further instances, the first longer side 101 may be configured to alternately contact aspects of the aft reaction wall 232 (FIGS. 1, 5A, 9A-B, 10A-C, 11A-C, 13, 17A, 18A-B, 19A-C, and 20A-C) such as the first aft reaction wall angled segment 233 or the second aft reaction wall angled segment 235; again, depending on the orientation of the nut 100 when combined with the clip 200.

The first longer side 101 may comprise an edge lying in a single plane. In further instances, localized bends, angles, chamfers, protrusions, bosses, and/or the like, may cause the first longer side 101 to have a more complex profile.

However, the first longer side 100 comprises an edge that at least partially conforms in corresponding shape to that of one of the forward reaction wall 234 (FIGS. 1, 5A, 9A-B, 10A-C, 11A-C, 13, 17A, 18A-B, 19A-C, and 20A-C) and the aft reaction wall 232 (FIGS. 1, 5A, 9A-B, 10A-C, 11A-C, 13, 17A, 18A-B, 19A-C, and 20A-C), depending on which it is arranged to selectably contact. In further instances, the first longer side 101 is also configured to align with and contact the interstitial forward reaction wall transverse segment 248 (FIGS. 1, 5A, 9A-B, 10A-C, 11A-C, 13, 17A, 18A-B, 19A-C, and 20A-C) or the interstitial aft reaction wall transverse segment 238 (FIGS. 1, 5A, 9A-B, 10A-C, 11A-C, 13, 17A, 18A-B, 19A-C, and 20A-C), when not twisted in a counterclockwise or clockwise direction by a fastener.

The second longer side 115 may comprise an edge of a plate, the second longer side 115 extending in an X-axis direction and lying in a Y-X plane (relative to the fastener insertion axis 9 and the fastener receiving portion 102 which may extend in a Z-axis direction normal to the Y-X plane). The second longer side 115 is disposed on an opposite side of the fastener receiving portion 102 from the first longer side 101, and in various embodiments comprises a parallel side. The second longer side 115 may be configured to alternately contact aspects of the forward reaction wall 234 (FIGS. 1, 5A, 9A-B, 10A-C, 11A-C, 13, 17A, 18A-B, 19A-C, and 20A-C) such as a first forward reaction wall angled segment 246 and a second forward reaction wall angled segment 250. In further instances, the second longer side 115 may be configured to alternately contact aspects of the aft reaction wall 232 (FIGS. 1, 5A, 9A-B, 10A-C, 11A-C, 13, 17A, 18A-B, 19A-C, and 20A-C) such as the first aft reaction wall angled segment 233 or the second aft reaction wall angled segment 235; again, depending on the orientation of the nut 100 when combined with the clip 200.

If the first longer side 101 is configured to alternately contact aspects of the aft reaction wall 232 (FIGS. 1, 5A, 9A-B, 10A-C, 11A-C, 13, 17A, 18A-B, 19A-C, and 20A-C), then the second longer side 115 is configured to alternately contact aspects of the forward reaction wall 234 (FIGS. 1, 5A, 9A-B, 10A-C, 11A-C, 13, 17A, 18A-B, 19A-C, and 20A-C). Similarly, if the first longer side 101 is configured to alternately contact aspects of the forward reaction wall 234 (FIGS. 1, 5A, 9A-B, 10A-C, 11A-C, 13, 17A, 18A-B, 19A-C, and 20A-C), then the second longer side 115 is configured to alternately contact aspects of the aft reaction wall 232 (FIGS. 1, 5A, 9A-B, 10A-C, 11A-C, 13, 17A, 18A-B, 19A-C, and 20A-C).

The second longer side 115 may comprise an edge lying in a single plane. In further instances, localized bends, angles, chamfers, protrusions, bosses, and/or the like, may cause the second longer side 115 to have a more complex profile. However, the second longer side 115 comprises an edge that at least partially conforms in corresponding shape to that of one of the forward reaction wall 234 (FIGS. 1, 5A, 9A-B, 10A-C, 11A-C, 13, 17A, 18A-B, 19A-C, and 20A-C) and the aft reaction wall 232 (FIGS. 1, 5A, 9A-B, 10A-C, 11A-C, 13, 17A, 18A-B, 19A-C, and 20A-C), depending on which it is arranged to selectably contact. In further instances, the second longer side 115 is also configured to align with and contact the interstitial forward reaction wall transverse segment 248 (FIGS. 1, 5A, 9A-B, 10A-C, 11A-C, 13, 17A, 18A-B, 19A-C, and 20A-C) or the interstitial aft reaction wall transverse segment 238 (FIGS. 1, 5A, 9A-B, 10A-C, 11A-C, 13, 17A, 18A-B, 19A-C, and 20A-C), when not twisted in a counterclockwise or clockwise direction by a fastener. While in various embodiments the first longer side 101 and the second longer side 115 comprise identical parallel sides, in further embodiments, the first longer side 101 and the second longer side 115 comprise different shapes corresponding to differently shaped forward reaction wall 234 (FIGS. 1, 5A, 9A-B, 10A-C, 11A-C, 13, 17A, 18A-B, 19A-C, and 20A-C) and/or differently shaped aft reaction wall 232 (FIGS. 1, 5A, 9A-B, 10A-C, 11A-C, 13, 17A, 18A-B, 19A-C, and 20A-C).

The first longer side 101 may terminate at longer distal ends of the force reaction portion 104. For example, the first longer side 101 may terminate at a first tab end wall 103-1 of a first tab 105-1 and a third tab end wall 103-3 of a third tab 105-3. Similarly, the second longer side 115 may terminate at longer distal ends of the force reaction portion 104. For example, the second longer side 115 may terminate at a second tab end wall 103-2 of a second tab 105-2 and a fourth tab end wall 103-4 of a fourth tab 105-4.

Thus one may appreciate that the force reaction portion 104 may comprise a series of tabs extending at each corner of the force reaction portion 104. The tabs may extend bounded at least partially by the first longer side 101 and second longer side 115 as applicable.

In various embodiments, the first tab 105-1 and the second tab 105-2 are on opposite ends of a shorter side of the force reaction portion 104 and define a relief cut out such as second relief cut out 108-2. The third tab 105-3 and the fourth tab 105-4 are also on opposite ends of the other shorter side of the force reaction portion 104 and define a relief cut out such as a first relief cutout 108-1. A relief cut out, such as a first relief cutout 108-1 and a second relief cutout 108-2 comprise an area within the profile of the force reaction portion 104 without material, thereby facilitating lightening of the nut 100.

Finally, the first tab end wall 103-1 and the third tab end wall 103-3 may define a distance along the second longer side 115 comprising a longer side length 113. Similarly, the second tab end wall 103-2 and the fourth tab end wall 103-4 may also define the distance along the first longer side 105 comprising the longer side length 113. The longer side length 113 may be selected to cause the first tab end wall 103-1, the second tab end wall 103-2, the third tab end wall 103-3 and the fourth tab end wall 103-4 to contact at least one of the forward reaction wall 234 (FIGS. 1, 5A, 9A-B, 10A-C, 11A-C, 13, 17A, 18A-B, 19A-C, and 20A-C) or the aft reaction wall 232 (FIGS. 1, 5A, 9A-B, 10A-C, 11A-C, 13, 17A, 18A-B, 19A-C, and 20A-C) at preselected locations during tightening and loosening operations, such as to ameliorate force concentration, distortion, bending and the like.

The force reaction portion 104 may further comprise a relief cutout longer side length 107 corresponding to the distance along a first longer side 105 and/or second longer side 115 measured from a floor of the first relief cutout 108-1 to a floor of the second relief cutout 108-2. In this manner, the relief cutouts operate to cause the relief cutout longer side length 107 to be less than the longer side length 113, thereby establishing the tab character of the first tab 105-1, the second tab 105-2, the third tab 105-3, and the fourth tab 105-4. However, one may appreciate that the first relief cutout 108-1 and/or the second relief cutout 108-2 may be omitted, so that a tab comprises a logical partition of a force reaction portion 104 such as a quadrant of a trapezoidal sheet member, or any other shape as desired.

Having now discussed both the clip 200 and the nut 100 (FIGS. 1 and 13) in detail, attention is directed to FIGS. 1 & 13, and FIGS. 9A-B, 10A-C, 11A-C, 18A-B, 19A-C, and 20A-C to discuss use cases and various relationships among the different aspects of a nut clip 2 during different use scenarios.

First, with reference to FIGS. 9A, 9B, 18A, and 18B, a nut 100 is disposed in centered relation 302 relative to a clip 200. In this instance the first longer side 105 and/or the second longer side 115 is/are parallel with the interstitial forward reaction wall transverse segment 248 and/or the interstitial aft reaction wall transverse segment 238. However, in various instances, the nut 100 is dimensioned so as to only parallely contact one of the interstitial forward reaction wall transverse segment 248 or the interstitial aft reaction wall transverse segment 238, to facilitate movement of the nut 100 to more readily align with and accept a fastener.

With reference to FIGS. 10A-C and 19A-C, a nut 100 is disposed in clockwise relation 304 relative to the clip 200 and a first clockwise contact area 402 and a second clockwise contact area 404 are shown. One may appreciate that the intersection of the first tab end wall 103-1 of the first tab 105-1 with the second longer side 115 contacts against the forward reaction wall 234, and, with reference to FIGS. 10A-C, may make such contact at the second forward reaction wall angled segment distal point of inflection 252. A first clockwise contact area 402 extends between this point along at least a portion of the second longer side 115.

Similarly, one may appreciate that the intersection of the fourth tab end wall 103-4 of the fourth tab 105-4 with the first longer side 105 may in various embodiments, contact against the aft reaction wall 232 at an intersection of the first reaction boss lateral side 257 and the first aft reaction wall angled segment 233, or may extend beyond the intersection of the first reaction boss lateral side 257 and the first aft reaction wall angled segment 233, or may contact the aft reaction wall 232 inward of the intersection of the first reaction boss lateral side 257 and the first aft reaction wall angled segment 233 at a point along the first aft reaction wall angled segment 233. In this manner and in various non-limiting embodiments, by providing less constraint to the second clockwise contact area 404 with respect to the intersection of the end wall of the tab to the side that is associated with the second clockwise contact area 404, than is provided to those associated with the first clockwise contact area 402, conditions of overconstraint may be ameliorated, further diminishing the unwanted effects of bending, distortion, and/or erosion of the nut 100 and/or clip 200.

Moreover, one may appreciate that because the first clockwise contact area 402 and the second clockwise contact area 404 are separated by one pi radian of arc length measured relative to the fastener insertion axis 9, during the clockwise twisting of the nut 100 during tightening or loosening of a fastener, the reacted forces are balanced with respect to the fastener insertion axis 9, further ameliorating the unwanted effects of bending, distortion, and/or erosion of the nut 100 and/or clip 200 by limiting the torque arm and by providing countervailing and balanced force vectors with reaction forces occluding further movement of the nut 100.

With reference to FIGS. 11A-C and 20A-C, a nut 100 is disposed in counterclockwise relation 306 to the clip 200 and first counterclockwise contact area 406 and a second counterclockwise contact area 408 are shown. One may appreciate that the intersection of the third tab end wall 103-3 of the third tab 105-3 with the second longer side 115 contacts against the forward reaction wall 234 and, with reference to FIGS. 11A-C, at the first forward reaction wall angled segment distal point of inflection 252. A first counterclockwise contact area 406 extends between this point along at least a portion of the second longer side 115.

Similarly, one may appreciate that the intersection of the second tab end wall 103-2 of the second tab 105-2 with the first longer side 105 may in various embodiments, contact against the aft reaction wall 232 at an intersection of the second reaction boss lateral side 259 and the second aft reaction wall angled segment 235, or may extend beyond the intersection of the second reaction boss lateral side 259 and the second aft reaction wall angled segment 235, or may contact the aft reaction wall 232 inward of the intersection of the second reaction boss lateral side 259 and the second aft reaction wall angled segment 235 at a point along the second aft reaction wall angled segment 235. In this manner and in various non-limiting embodiments, by providing less constraint to the second counterclockwise contact area 408 with respect to the intersection of the end wall of the tab to the side that is associated with the second counterclockwise contact area 408, than is provided to those associated with the first counterclockwise contact area 406, conditions of overconstraint may be ameliorated, further diminishing the unwanted effects of bending, distortion, and/or erosion of the nut 100 and/or clip 200.

Moreover, one may appreciate that because the first counterclockwise contact area 406 and the second counterclockwise contact area 408 are separated by one pi radian of arc length measured relative to the fastener insertion axis 9, during the clockwise twisting of the nut 100 during tightening or loosening of a fastener, the reacted forces are balanced with respect to the fastener insertion axis 9, further ameliorating the unwanted effects of bending, distortion, and/or erosion of the nut 100 and/or clip 200 by limiting the torque arm and by providing countervailing and balanced force vectors with reaction forces occluding further movement of the nut 100.

With reference now to FIGS. 1, 10C, 11C, 19C, and 20C, the nut 100 and clip 200 of the nut clip 2 are discussed with respect to various projected axes, vectors, and points. The nut 100 and clip 200 and the features thereof, particularly the forward reaction wall 234 and the aft reaction wall 232 are shaped to achieve various axes, vectors, and points, so that the structure of the nut 100 and clip 200 may be defined by these projected axes, vectors, and points. For example, a central longitudinal axis 7 may be intersected by a perpendicular lateral axis 711 that is aligned with the fastener insertion axis 9. Thus, the intersection of the lateral axis 711 with the fastener insertion axis 9 provides a transverse fastener passage alignment point 719 corresponding to the center of the main body aperture 216 and/or the fastener tube 112 aligned with the transverse fastener passage 214 and fastener insertion axis 9. When the nut 100 is disposed in a centered relation 203, a clockwise relation 304, and a counterclockwise relation 306 with respect to the nut 100, different projected edges of the nut 100 intersect the central longitudinal axis 7 and the lateral axis 711 at different locations, the quantification of which may define the structure of the nut 100 and clip 200, especially as relates to the forward reaction wall 234 and the aft reaction wall 232.

Figure 10A:
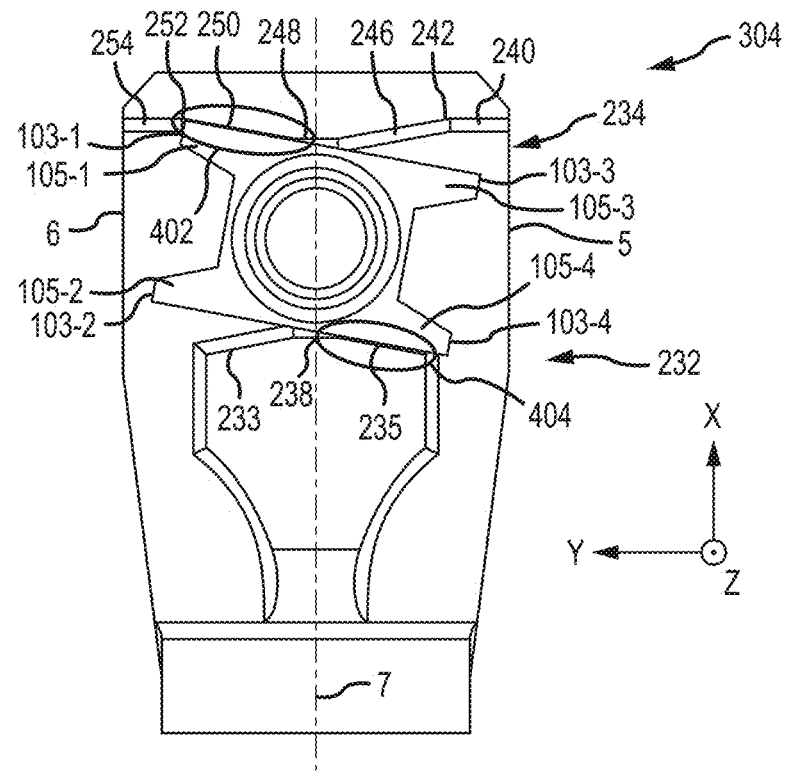
FIG. 10A illustrates a top view of an example combination of nut and clip of a nut clip in clockwise relation, in accordance with various embodiments.
Figure 10B:
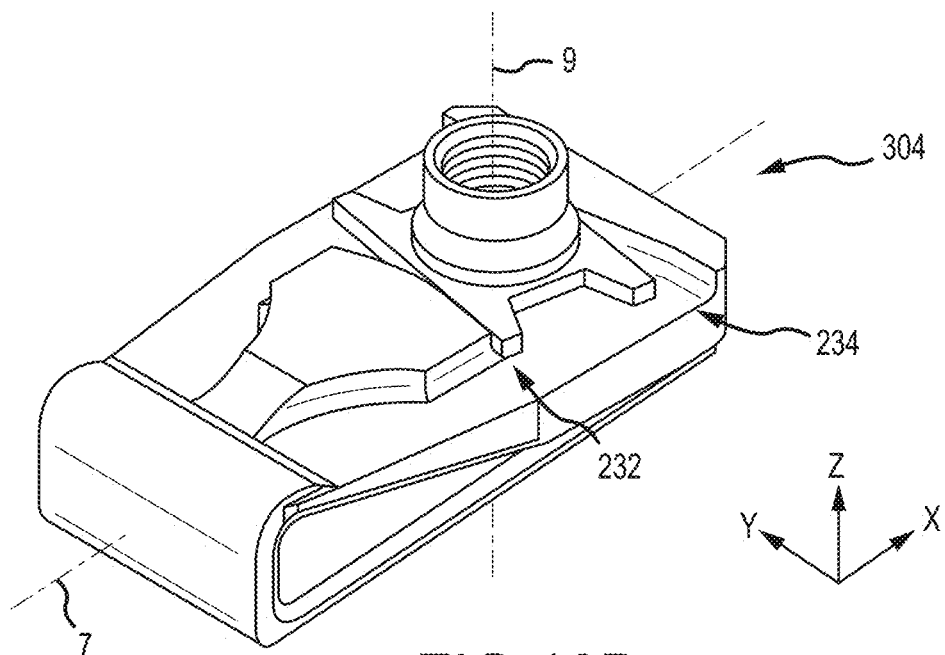
FIG. 10B illustrates a further view of an example combination of nut and clip of a nut clip in a clockwise relation, in accordance with various embodiments.
Figure 10C:
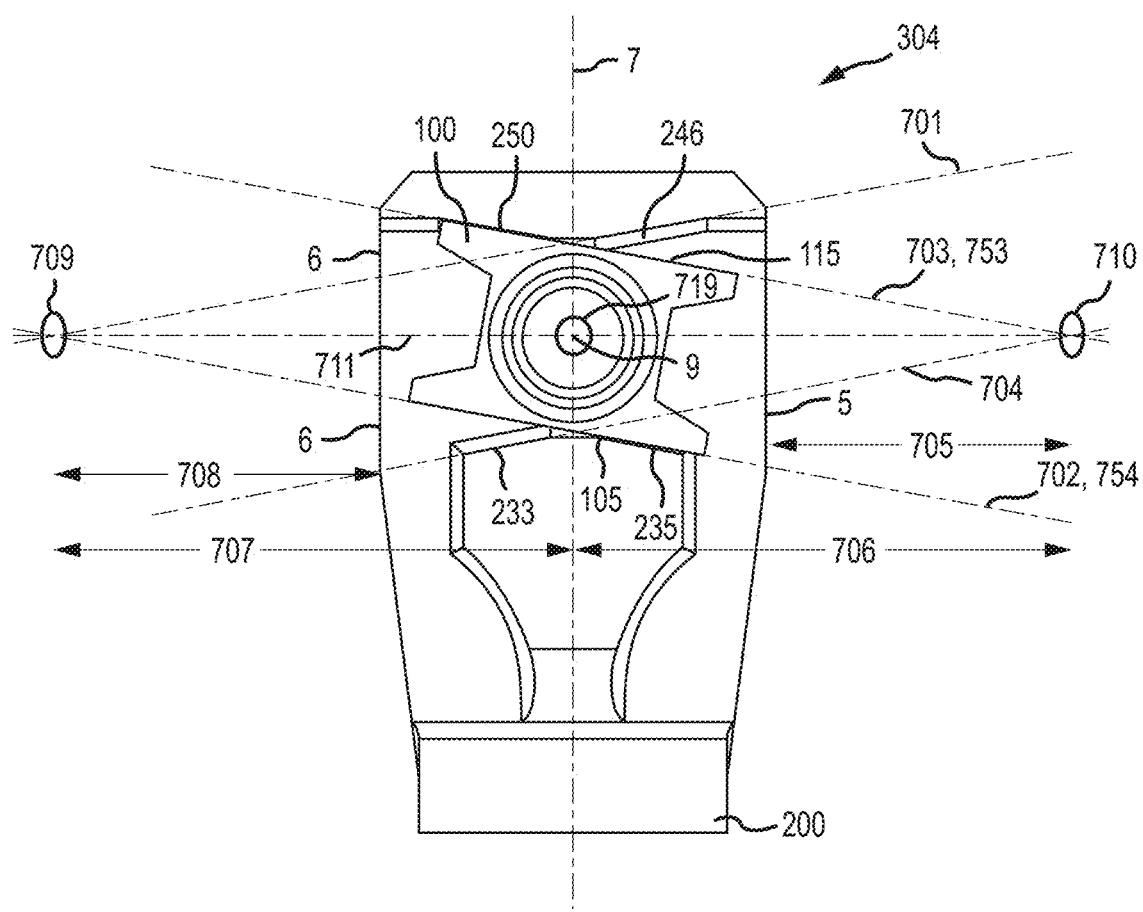
FIG. 10C illustrates a top view of an example combination of nut and clip of a nut clip in clockwise relation showing various lines and axes, in accordance with various embodiments.
Figure 19A:
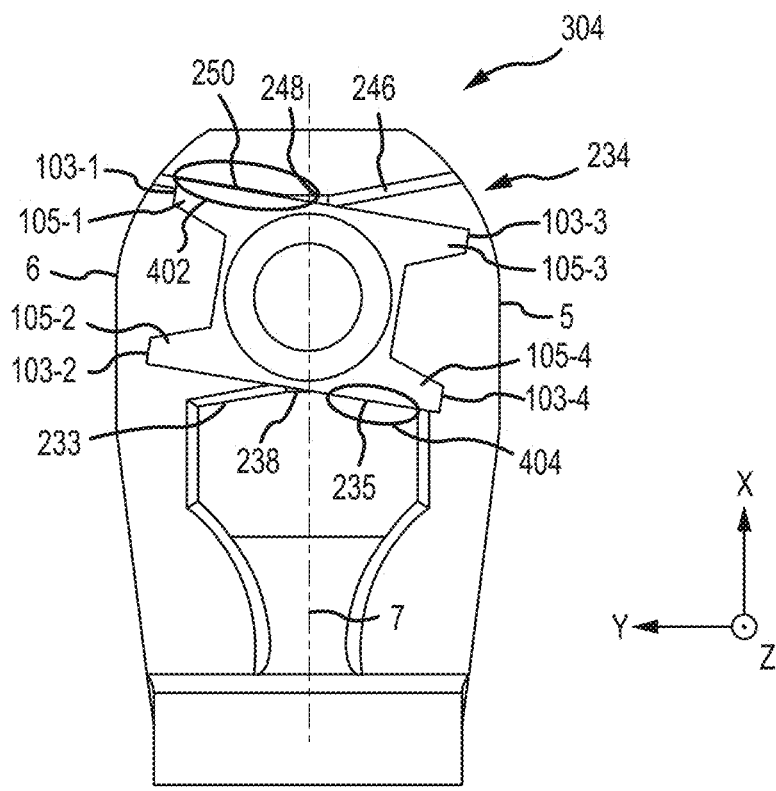
FIG. 19A illustrates a top view of the further example combination of nut and clip of a nut clip in clockwise relation, in accordance with various embodiments.
Figure 19B:
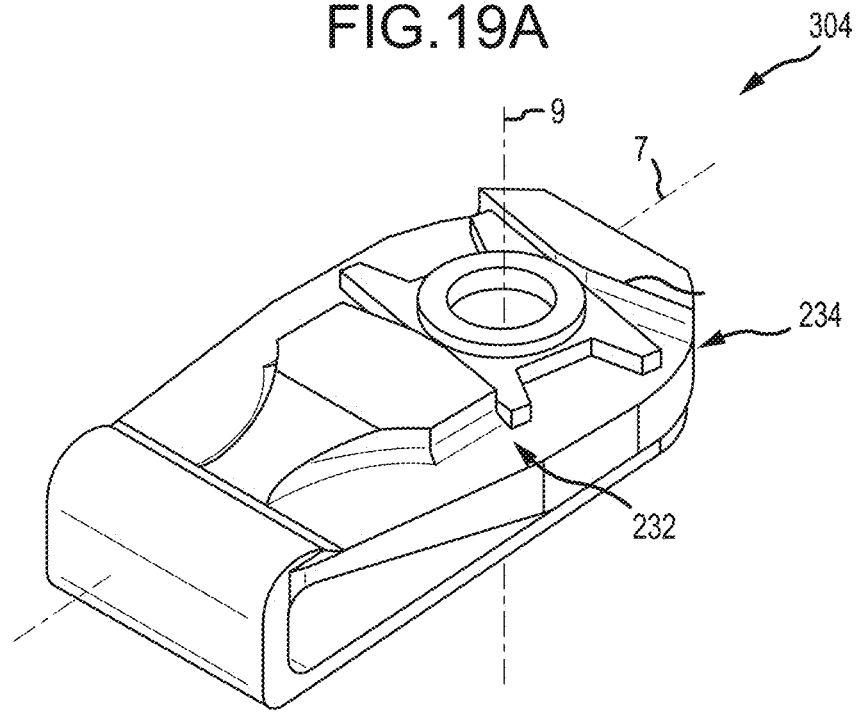
FIG. 19B illustrates a further view of the further example combination of nut and clip of a nut clip in a clockwise relation, in accordance with various embodiments.
Figure 19C:
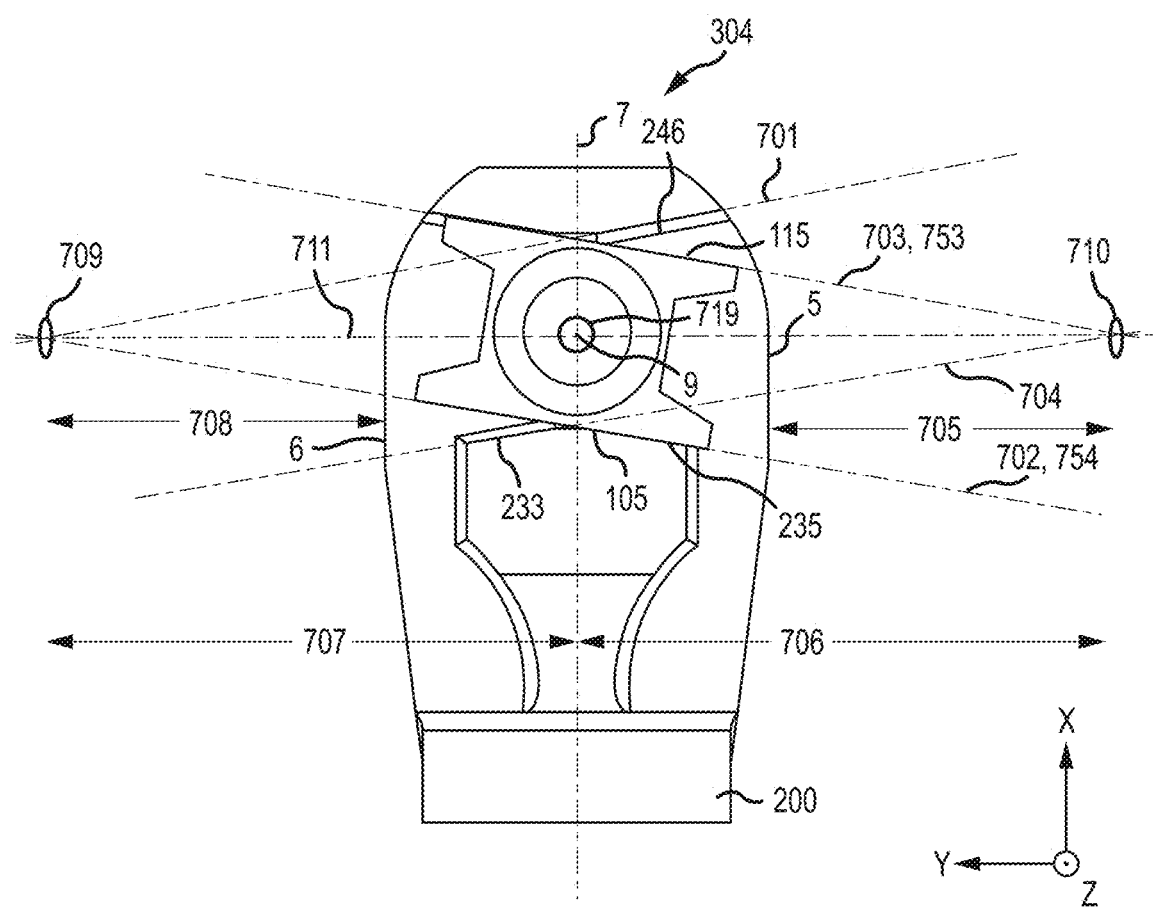
FIG. 19C illustrates a top view of the further example combination of nut and clip of a nut clip in clockwise relation showing various lines and axes, in accordance with various embodiments.

In various embodiments, with reference to FIGS. 1, 10A-C, and 19A-C, but with particular emphasis on FIGS. 10C and 19C, a nut 100 in clockwise relation 304 to the clip 200 may comprise a first longer side edge projection 702 comprising a line projected in the plane occupied by the central longitudinal axis 7 and the lateral axis 711 corresponding to the first longer side 105, and a second longer side edge projection 703 comprising a line projected in the plane occupied by the central longitudinal axis 7 and the lateral axis 711 corresponding to the second longer side 115. At the same time, the clip 200 may comprise a first forward reaction wall angled segment projection 701 comprising a line projected in the plane occupied by the central longitudinal axis 7 and the lateral axis 711 corresponding to the first forward reaction wall angled segment 246. Also, at the same time, the clip 200 may comprise a second forward reaction wall angled segment projection 753 comprising a line projected in the plane occupied by the central longitudinal axis 7 and the lateral axis 711 corresponding to the second forward reaction wall angled segment 250. Likewise, the clip 200 may comprise a first aft reaction wall angled segment projection 704 comprising a line projected in the plane occupied by the central longitudinal axis 7 and the lateral axis 711 corresponding to the first aft reaction wall angled segment 233. Finally, the clip 200 may comprise a second aft reaction wall angled segment projection 754 comprising a line projected in the plane occupied by the central longitudinal axis 7 and the lateral axis 711 corresponding to the second aft reaction wall angled segment 235.

Thus, these various projections may in various instances intersect at points, depending on the orientation of the nut 100 to the clip 200. By characterizing the location of these intersections, one may characterize the structure of the clip 200 with respect to the nut 100 and the relation between the features of the nut 100 to the features of the clip 200 during use.

For example, with reference to FIGS. 10C and 19C, the nut 100 is in clockwise relation 304 to the clip 200. Notably, the first forward reaction wall angled segment projection 701 and the first aft reaction wall angled segment projection 704 comprise parallel spaced apart lines. In addition, the second forward reaction wall angled segment projection 753 and the second aft reaction wall angled segment projection 754 comprise parallel spaced apart lines. Similarly, the first longer side edge projection 702 and the second longer side edge projection 703 comprise parallel spaced apart lines.

The first longer side edge projection 702 and the first forward reaction wall angled segment projection 701 intersect each other and the lateral axis 711 at a left side intersection point 709. The second longer side edge projection 703 and the first aft reaction wall angled segment projection 704 intersect each other and the lateral axis 711 at a right side intersection point 710.

The first longer side edge projection 702 and the second aft reaction wall angled segment projection 754 are substantially coincident, because the first longer side 105 abuts against the second aft reaction wall angled segment 235 when the nut 100 is in clockwise relation 304 to the clip 200. The second longer side edge projection 703 and the second forward reaction wall angled segment projection 753 are substantially coincident, because the second longer side 115 abuts the second forward reaction wall angled segment 250.

In various embodiments, the right side intersection point 710 is a distance from the central longitudinal axis 7 as measured along the lateral axis 711 termed a "first right side intersection point to central longitudinal axis distance 706," or for brevity, a "FRSIPCLA distance" 706. Similarly, the left side intersection point 709 is a distance from the central longitudinal axis 7 as measured along the lateral axis 711 termed a "first left side intersection point to central longitudinal axis distance 707," or for brevity, a "FLSIPCLA distance" 707.

In various embodiments, the FLSIPCLA distance 707 and the FRSIPCLA distance 706 are equal. In various embodiments, the FRSIPCLA distance 706 is greater than one half the width of the clip 200 as measured between the first side 5 and second side 6. In various embodiments, the FLSIPCLA distance 707 is greater than one half the width of the clip 200 as measured between the first side 5 and second side 6. In various embodiments, the FLSIPCLA distance 707 plus the FRSIPCLA distance 706 summed together is greater than the distance between the first side 5 and the second side 6 of the clip 200. Thus, one may appreciate that there is a first right side intersection point to first side distance 705 ("FRSIPFS distance" 705) measured between the right side intersection point 710 and the first side 5, as well as a first left side intersection point to second side distance 708 ("FLSIPSS distance" 708) measured between the left side intersection point 709 and the second side 6. In various embodiments, the FLSIPSS distance 708 is greater than zero. Moreover, in various embodiments, the FRSIPFS distance 705 is also greater than zero. In various embodiments, the FLSIPSS distance 708 and the FRSIPFS distance 705 are equal.

Figure 11A:
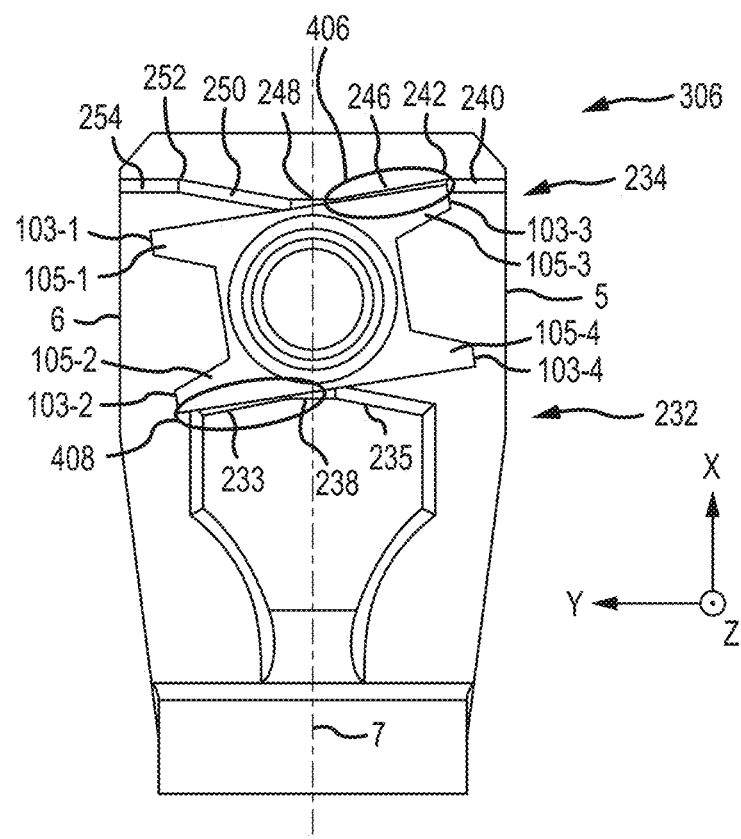
FIG. 11A illustrates a top view of an example combination of nut and clip of a nut clip in counterclockwise relation, in accordance with various embodiments.
Figure 11B:
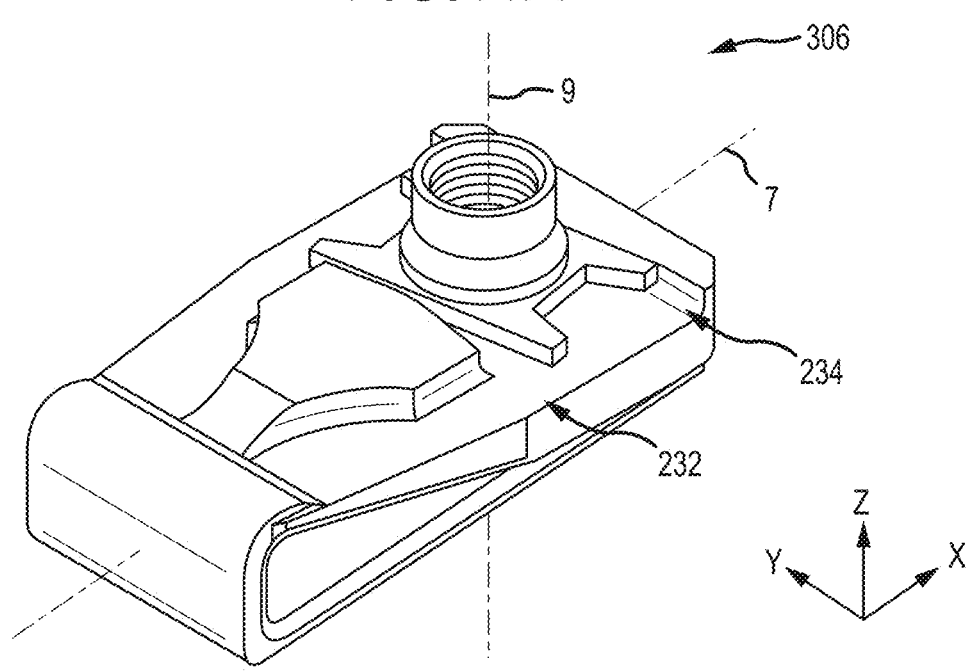
FIG. 11B illustrates a further view of an example combination of nut and clip of a nut clip in a counterclockwise relation, in accordance with various embodiments.
Figure 11C:
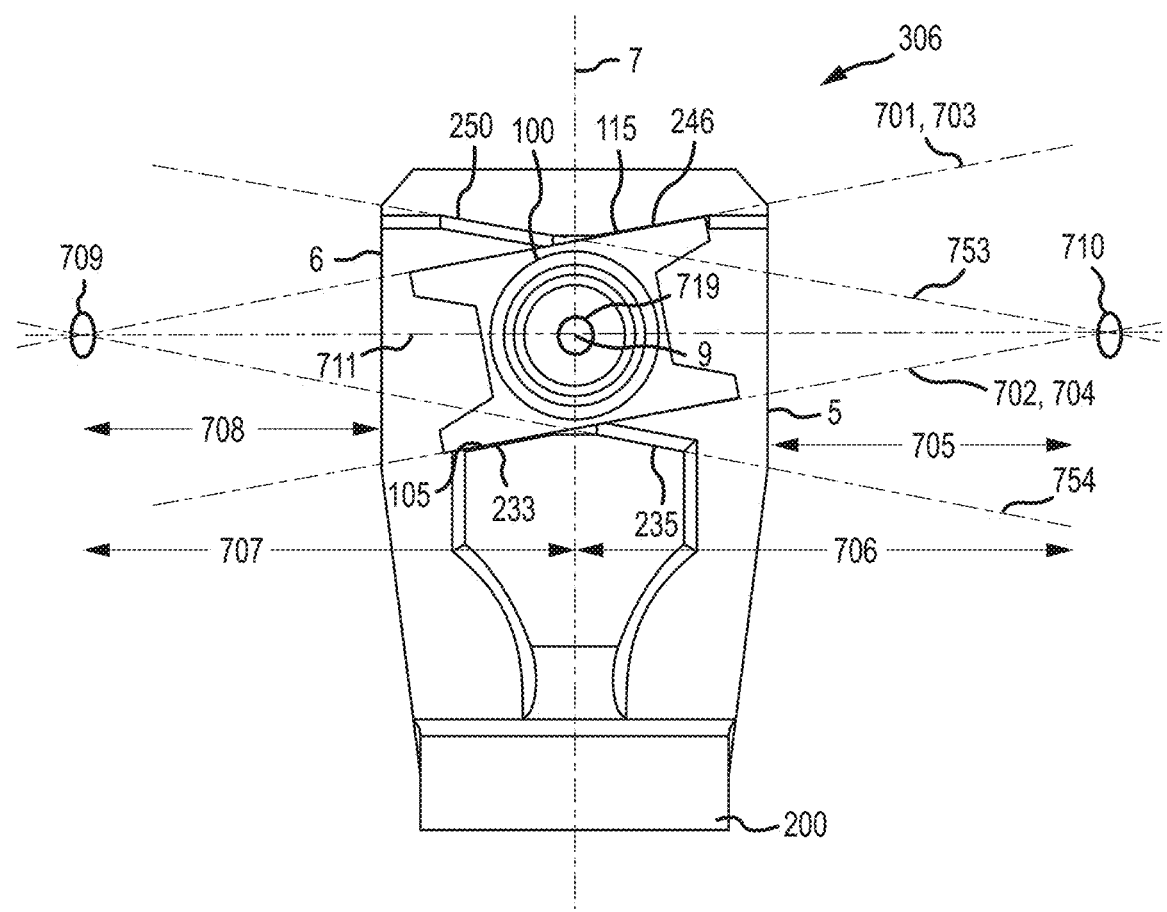
FIG. 11C illustrates a top view of an example combination of nut and clip of a nut clip in counterclockwise relation showing various lines and axes, in accordance with various embodiments.
Figure 20A:
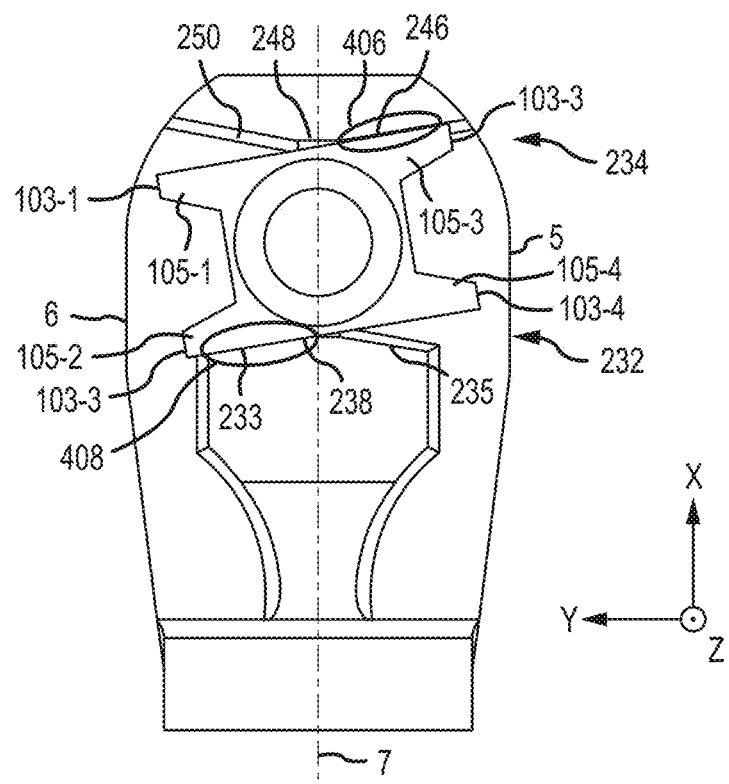
FIG. 20A illustrates a top view of the further example combination of nut and clip of a nut clip in counterclockwise relation, in accordance with various embodiments.
Figure 20B:
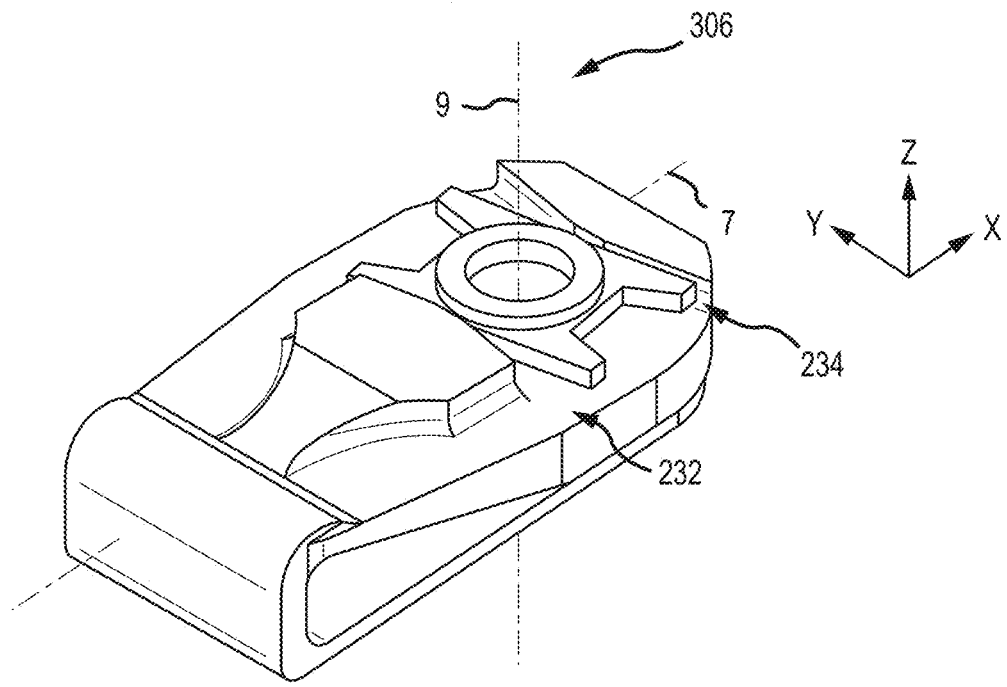
FIG. 20B illustrates a further view of the further example combination of nut and clip of a nut clip in a counterclockwise relation, in accordance with various embodiments.
Figure 20C:
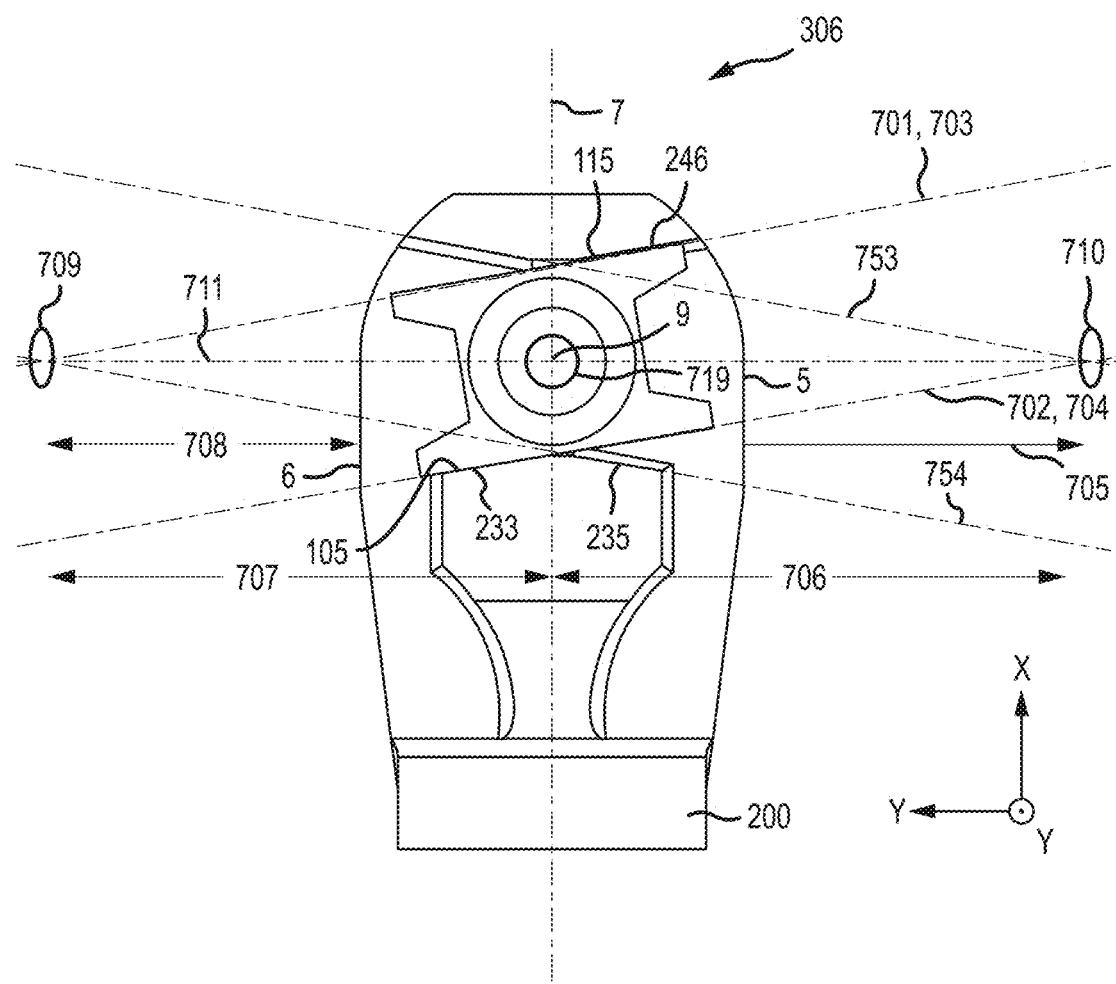
FIG. 20C illustrates a top view of the further example combination of nut and clip of a nut clip in counterclockwise relation showing various lines and axes, in accordance with various embodiments.

In various embodiments, with reference to FIGS. 1, 11A-C, and 20A-C, but with particular emphasis on FIGS. 11C and 20C, a nut 100 in counterclockwise relation 306 to the clip 200 may comprise a first longer side edge projection 702 comprising a line projected in the plane occupied by the central longitudinal axis 7 and the lateral axis 711 corresponding to the first longer side 105, and a second longer side edge projection 703 comprising a line projected in the plane occupied by the central longitudinal axis 7 and the lateral axis 711 corresponding to the second longer side 115. At the same time, the clip 200 may comprise a first forward reaction wall angled segment projection 701 comprising a line projected in the plane occupied by the central longitudinal axis 7 and the lateral axis 711 corresponding to the first forward reaction wall angled segment 246. Also, at the same time, the clip 200 may comprise a second forward reaction wall angled segment projection 753 comprising a line projected in the plane occupied by the central longitudinal axis 7 and the lateral axis 711 corresponding to the second forward reaction wall angled segment 250. Likewise, the clip 200 may comprise a first aft reaction wall angled segment projection 704 comprising a line projected in the plane occupied by the central longitudinal axis 7 and the lateral axis 711 corresponding to the first aft reaction wall angled segment 233. Finally, the clip 200 may comprise a second aft reaction wall angled segment projection 754 comprising a line projected in the plane occupied by the central longitudinal axis 7 and the lateral axis 711 corresponding to the second aft reaction wall angled segment 235.

Thus, these various projections may in various instances intersect at points, depending on the orientation of the nut 100 to the clip 200. By characterizing the location of these intersections, one may characterize the structure of the clip 200 with respect to the nut 100 and the relation between the features of the nut 100 to the features of the clip 200 during use.

For example, with reference to FIGS. 11C and 20C, the nut 100 is in counterclockwise relation 306 to the clip 200. Notably, the first forward reaction wall angled segment projection 701 and the first aft reaction wall angled segment projection 704 comprise parallel spaced apart lines. In addition, the second forward reaction wall angled segment projection 753 and the second aft reaction wall angled segment projection 754 comprise parallel spaced apart lines. Similarly, the first longer side edge projection 702 and the second longer side edge projection 703 comprise parallel spaced apart lines.

The second longer side edge projection 703 and the second aft reaction wall angled segment projection 754 intersect each other and the lateral axis 711 at a left side intersection point 709. The first longer side edge projection 702 and the second forward reaction wall angled segment projection 753 intersect each other and the lateral axis 711 at a right side intersection point 710.

The first longer side edge projection 702 and the first aft reaction wall angled segment projection 704 are substantially coincident, because the first longer side 105 abuts against the first aft reaction wall angled segment 233 when the nut 100 is in counterclockwise relation 306 to the clip 200. Similarly, the second longer side edge projection 703 and the first forward reaction wall angled segment projection 701 are substantially coincident, because the second longer side 115 abuts against the second forward reaction wall angled segment 250 when the nut 100 is in counterclockwise relation 306 to the clip 200.

In various embodiments, the right side intersection point 710 is a distance from the central longitudinal axis 7 as measured along the lateral axis 711 termed a "first right side intersection point to central longitudinal axis distance 706," or for brevity, a "FRSIPCLA distance" 706. Similarly, the left side intersection point 709 is a distance from the central longitudinal axis 7 as measured along the lateral axis 711 termed a "first left side intersection point to central longitudinal axis distance 707," or for brevity, a "FLSIPCLA distance" 707.

In various embodiments, the FLSIPCLA distance 707 and the FRSIPCLA distance 706 are equal. In various embodiments, the FRSIPCLA distance 706 is greater than one half the width of the clip 200 as measured between the first side 5 and second side 6. In various embodiments, the FLSIPCLA distance 707 is greater than one half the width of the clip 200 as measured between the first side 5 and second side 6. In various embodiments, the FLSIPCLA distance 707 plus the FRSIPCLA distance 706 summed together is greater than the distance between the first side 5 and the second side 6 of the clip 200. Thus, one may appreciate that there is a first right side intersection point to first side distance 705 ("FRSIPFS distance" 705) measured between the right side intersection point 710 and the first side 5, as well as a first left side intersection point to second side distance 708 ("FLSIPSS distance" 708) measured between the left side intersection point 709 and the second side 6. In various embodiments, the FRSIPFS distance 705 is greater than zero. Moreover, in various embodiments, the FLSIPSS distance 708 is also greater than zero. In various embodiments, the FRSIPFS distance 705 and the FLSIPSS distance 708 are equal.

Figure 12:
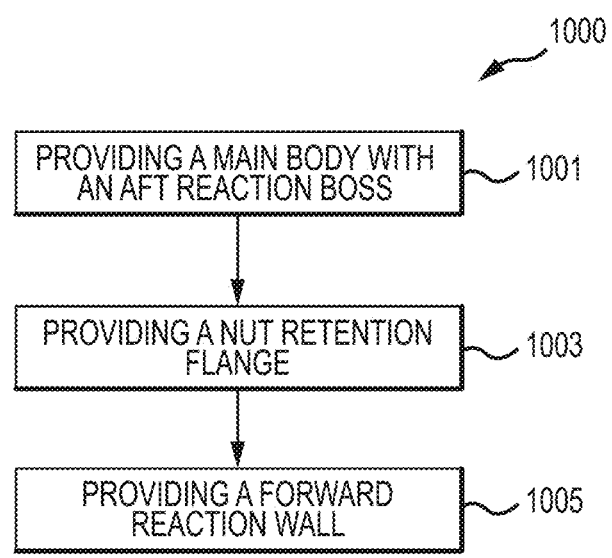
FIG. 12 depicts an example method of providing a clip of a nut clip, in accordance with various embodiments.

Finally, directing attention to FIGS. 1-11C and 13-20C, as well as with particular emphasis on FIG. 12, a method 1000 of forming a clip 200 of a nut clip 2 is provided. The method 1000 may include providing a main body 202 comprising an aft reaction boss 212 defining at least a portion of a nut containment channel 230 (block 1001). The method may also include providing a nut retention flange 208 defining at least a further portion of the nut containment channel 30 and connected to the main body 202 by a nut retention flange attachment member 210 spaced apart from the aft reaction boss 212 (block 1003). Furthermore, the method may include providing a forward reaction wall 234 comprising portion of the nut retention flange attachment member 210 facing the nut containment channel 230 (block 1005). In various embodiments of the method, the aft reaction boss 212 may be provided having an aft reaction wall 232. Moreover, the aft reaction wall 232 and the forward reaction wall 234 may be configured to be selectably contacted by a nut 100 within the nut containment channel 230 to occlude rotation of the nut 100.

With respect to the method 1000 of forming the clip 200 for the nut clip 2, the aft reaction wall 232 that is provided may also include aspects. Specifically, the aft reaction wall 232 may include a first aft reaction wall angled segment 233 comprising a first surface of the aft reaction wall 232 and a second aft reaction wall angled segment 235 comprising a second surface of the aft reaction wall 232 and disposed at an angle relative to the first aft reaction wall angled segment 233. Furthermore, the forward reaction wall 234 may include a first forward reaction wall angled segment 246 comprising a first surface of the forward reaction wall 234. The forward reaction wall 234 may include a second forward reaction wall angled segment 250 comprising a second surface of the forward reaction wall 234 and disposed at an angle relative to first forward reaction wall angled segment 246.

In various embodiments of the method 1000, there is also a first forward reaction wall angled segment projection 701 comprising a line projected along the first forward reaction wall angled segment 246 that is non-intersecting to a first aft reaction wall angled segment projection 704 comprising a line projected along the first aft reaction wall angled segment 233. Moreover, a second forward reaction wall angled segment projection 753 may comprise a line projected along the second forward reaction wall angled segment 250 that is non-intersecting to a second aft reaction wall angled segment projection 754 comprising a line projected along the second aft reaction wall angled segment 235.

The clip 200 for the nut clip 2 formed according the method 1000 may also include wherein a first forward reaction wall angled segment projection 701 comprising a line projected along the first forward reaction wall angled segment 246 intersects a second aft reaction wall angled segment projection 754 comprising a line projected along the second aft reaction wall angled segment 235 at a left side intersection point 709 outside the edge of the main body 202 along the lateral axis 711 of the main body 202. Furthermore, a second forward reaction wall angled segment projection 753 comprising a line projected along the second forward reaction wall angled segment 250 intersects a first aft reaction wall angled segment projection 704 comprising a line projected along the first aft reaction wall angled segment 233 at a right side intersection point 710 outside the edge of the main body 202. In addition, the left side intersection point 709 and the right side intersection point 710 may be equidistant from a central longitudinal axis 7 of the main body 202.

With reference to FIGS. 1-20C, having discussed aspects of a nut clip 2, a nut clip 2 and/or its component clip 200 and/or nut 100 may be made of various materials. For instance, a nut clip 2 and/or its component clip 200 and/or nut 100 may be made of a single material, or different materials, or combinations of materials. For example, components of the system are made from metal. For example, aspects of a nut clip 2 and/or its component clip 200 and/or nut 100 are metal, such as nickel, cobalt, molybdenum, titanium, aluminum, steel, or stainless steel, though it alternatively comprises numerous other materials configured to provide support. Components of the system are optionally made from other materials such as, for example, composite, ceramic, plastics, polymers, alloys, glass, binder, epoxy, polyester, acrylic, or any material or combination of materials having desired material properties, such as heat tolerance, strength, stiffness, or weight.

Portions of a nut clip 2 and/or its component clip 200 and/or nut 100 as disclosed herein are optionally made of different materials or combinations of materials, and/or comprise coatings. Moreover, components of the nut clip 2 and/or its component clip 200 and/or nut 100 are in some instances mixtures of different materials according to different ratios, gradients, and the like.

A nut clip 2 and/or its component clip 200 and/or nut 100 thus may have multiple materials, or any material configuration suitable to enhance or reinforce the resiliency and/or support of the system when subjected to wear in an operating environment such as an aircraft operating environment, or to satisfy other desired electromagnetic, chemical, physical, or material properties, for example coefficient of thermal expansion, ductility, weight, flexibility, strength, or heat tolerance.

One such material is Trogamid. In various embodiments, a clip 200 may comprise Trogamid, such as Trogamid CX7323 polyamide. A further such material is a polyamide-imide. For example, the polyamide-imide may be a Torlon® polyamide-imide. In various embodiments, a clip 200 may comprise polyamide-imide, such as a Torlon® polyamide-imide. In various embodiments, a nut 100 may comprise cadmium plate. The nut 100 may be passivated.

Further such material may be an austenitic nickel-chromium-based alloy such as Inconel®, which is available from Special Metals Corporation of New Hartford, N.Y., USA. Other such material includes ceramic matrix composite (CMC). Further material includes refractory metal, for example, an alloy of titanium, such as, titanium-zirconium-molybdenum (TZM).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A clip for a nut clip comprising:
    a main body comprising an aft reaction boss defining at least a portion of a nut containment channel;
    a nut retention flange defining at least a further portion of the nut containment channel and connected to the main body by a nut retention flange attachment member spaced apart from the aft reaction boss; and
    a forward reaction wall comprising portion of the nut retention flange attachment member facing the nut containment channel,
    wherein the aft reaction boss comprises an aft reaction wall, and
    wherein the aft reaction wall and the forward reaction wall are configured to be selectably contacted by a nut within the nut containment channel to occlude rotation of the nut,
    wherein the aft reaction wall comprises:
        a first aft reaction wall angled segment comprising a first surface of the aft reaction wall;
        a second aft reaction wall angled segment comprising a second surface of the aft reaction wall and disposed at an angle relative to the first aft reaction wall angled segment;
    wherein the forward reaction wall comprises:
        a first forward reaction wall angled segment comprising a first surface of the forward reaction wall;
        a second forward reaction wall angled segment comprising a second surface of the forward reaction wall and disposed at an angle relative to first forward reaction wall angled segment;
    wherein a first forward reaction wall angled segment projection comprising a line projected along the first forward reaction wall angled segment intersects a second aft reaction wall angled segment projection comprising a line projected along the second aft reaction wall angled segment at a left side intersection point outside an edge of the main body.

2. The clip for the nut clip according to claim 1, wherein the first forward reaction wall angled segment projection comprising the line projected along the first forward reaction wall angled segment is non-intersecting to a first aft reaction wall angled segment projection comprising a line projected along the first aft reaction wall angled segment, wherein a second forward reaction wall angled segment projection comprising a line projected along the second forward reaction wall angled segment is non-intersecting to the second aft reaction wall angled segment projection comprising the line projected along the second aft reaction wall angled segment.

3. The clip for the nut clip according to claim 1, wherein a second forward reaction wall angled segment projection comprising a line projected along the second forward reaction wall angled segment intersects a first aft reaction wall angled segment projection comprising a line projected along the first aft reaction wall angled segment at a right side intersection point outside the edge of the main body.

4. The clip according to claim 3, wherein the left side intersection point and the right side intersection point are equidistant from a central longitudinal axis of the main body.

5. A nut clip comprising:
a clip comprising:
a main body comprising an aft reaction boss defining at least a portion of a nut containment channel and having an aft reaction wall;
a forward reaction wall defining at least a portion of a nut containment channel and spaced apart from the aft reaction wall;
a nut disposed between the aft reaction wall and the forward reaction wall and comprising:
a first longer side having a first longer side projection comprising a line projected in a plane occupied by a central longitudinal axis of the main body and a lateral axis of the main body;
a second longer side opposite the first longer side and having a second longer side projection comprising a line projected in the plane occupied by the central longitudinal axis of the main body and the lateral axis of the main body;
wherein the aft reaction wall of the clip comprises:
a first aft reaction wall angled segment having a first aft reaction wall angled segment projection comprising a line projected in the plane occupied by the central longitudinal axis and the lateral axis and corresponding to the first aft reaction wall angled segment;
a second aft reaction wall angled segment having a second aft reaction wall angled segment projection comprising a line projected in the plane occupied by the central longitudinal axis and the lateral axis and corresponding to the second aft reaction wall angled segment;
wherein the forward reaction wall comprises:
a first forward reaction wall angled segment having a first forward reaction wall angled segment projection comprising a line projected in the plane occupied by the central longitudinal axis and the lateral axis and corresponding to the first forward reaction wall angled segment;
a second forward reaction wall angled segment having a second forward reaction wall angled segment projection comprising a line projected in the plane occupied by the central longitudinal axis and the lateral axis and corresponding to the second forward reaction wall angled segment;
wherein the first aft reaction wall angled segment comprises a first surface of the aft reaction wall;

wherein the second aft reaction wall angled segment comprises a second surface of the aft reaction wall at an angle with respect to the first aft reaction wall angled segment;

wherein the first forward reaction wall angled segment comprises a first surface of the forward reaction wall;

wherein the second forward reaction wall angled segment comprises a second surface of the forward reaction wall;

wherein the second longer side edge projection of the second longer side and the first aft reaction wall angled segment projection of the first aft reaction wall angled segment intersect the lateral axis at a first point outside an edge of the main body in response to the nut having a clockwise relation relative to the main body;

wherein the first longer side edge projection of the first longer side and the second forward reaction wall angled segment projection intersect the lateral axis at the first point outside the edge of the main body in response to the nut having a counterclockwise relation relative to the main body.

6. The nut clip according to claim 5, wherein the second longer side edge projection of the second longer side and the second aft reaction wall angled segment projection of the second aft reaction wall angled segment intersect the lateral axis at a second point outside the edge of the main body in response to the nut having a counterclockwise relation relative to the main body; and wherein the first longer side edge projection of the first longer side and the first forward reaction wall angled segment projection of the first forward reaction wall angled segment intersect the lateral axis at the second point outside the edge of the main body in response to the nut having a counterclockwise relation relative to the main body.

7. The nut clip according to claim 6, wherein the first point outside the edge of the main body and the second point outside the edge of the main body are equidistant from the central longitudinal axis of the main body and on opposite lateral sides of the central longitudinal axis.

8. The nut clip according to claim 6, wherein a first longer side edge of the first longer side abuts the second aft reaction wall angled segment and a second longer side edge of the second longer side abuts the second forward reaction wall angled segment in response to the nut being in clockwise relation relative to the main body.

9. The nut clip according to claim 6, wherein a first longer side edge of the first longer side abuts the first aft reaction wall angled segment and a second longer side edge of the second longer side abuts the first forward reaction wall angled segment in response to the nut being in counterclockwise relation relative to the main body.

10. The nut clip according to claim 6, wherein the first forward reaction wall angled segment and the second forward reaction wall angled segment comprise a reflection about the lateral axis of the second aft reaction wall angled segment and the first aft reaction wall angled segment, respectively.

11. The nut clip according to claim 6, wherein the first forward reaction wall angled segment comprises a reflection of the second forward reaction wall angled segment about the central longitudinal axis of the main body.

12. The nut clip according to claim 6, wherein the first aft reaction wall angled segment comprises a reflection of the second aft reaction wall angled segment about a central longitudinal axis of the main body.

13. A method of forming a clip for a for a nut clip comprising:
- providing a main body comprising an aft reaction boss defining at least a portion of a nut containment channel;
- providing a nut retention flange defining at least a further portion of the nut containment channel and connected to the main body by a nut retention flange attachment member spaced apart from the aft reaction boss; and
- providing a forward reaction wall comprising portion of the nut retention flange attachment member facing the nut containment channel,
- wherein the aft reaction boss comprises an aft reaction wall, and
- wherein the aft reaction wall and the forward reaction wall are configured to be selectably contacted by a nut within the nut containment channel to occlude rotation of the nut,
- wherein the aft reaction wall comprises:
  - a first aft reaction wall angled segment comprising a first surface of the aft reaction wall;
  - a second aft reaction wall angled segment comprising a second surface of the aft reaction wall and disposed at an angle relative to the first aft reaction wall angled segment; and
- wherein the forward reaction wall comprises:
  - a first forward reaction wall angled segment comprising a first surface of the forward reaction wall; and
  - a second forward reaction wall angled segment comprising a second surface of the forward reaction wall and disposed at an angle relative to first forward reaction wall angled segment,
- wherein a first forward reaction wall angled segment projection comprising a line projected along the first forward reaction wall angled segment is non-intersecting to a first aft reaction wall angled segment projection comprising a line projected along the first aft reaction wall angled segment,
- wherein a second forward reaction wall angled segment projection comprising a line projected along the second forward reaction wall angled segment is non-intersecting to a second aft reaction wall angled segment projection comprising a line projected along the second aft reaction wall angled segment, and
- wherein a first forward reaction wall angled segment projection comprising a line projected along the first forward reaction wall angled segment intersects a second aft reaction wall angled segment projection comprising a line projected along the second aft reaction wall angled segment at a left side intersection point outside an edge of the main body,
- wherein a second forward reaction wall angled segment projection comprising a line projected along the second forward reaction wall angled segment intersects a first aft reaction wall angled segment projection comprising a line projected along the first aft reaction wall angled segment at a right side intersection point outside the edge of the main body.

14. The method of forming the clip for the nut clip according to claim 13,
- wherein the left side intersection point and the right side intersection point are equidistant from a central longitudinal axis of the main body.

* * * * *